United States Patent
Kondo

(10) Patent No.: US 11,970,265 B2
(45) Date of Patent: Apr. 30, 2024

(54) FLOATING MOVING DEVICE

(71) Applicant: TATSUMI RYOKI CO., LTD, Tokyo (JP)

(72) Inventor: Toyoshi Kondo, Tokyo (JP)

(73) Assignee: TATSUMI RYOKI CO., LTD, Tokyo (JP)

(*) Notice: Subject to any disclaimer, the term of this patent is extended or adjusted under 35 U.S.C. 154(b) by 134 days.

(21) Appl. No.: 17/788,652

(22) PCT Filed: Dec. 22, 2020

(86) PCT No.: PCT/JP2020/047854
§ 371 (c)(1),
(2) Date: Jun. 23, 2022

(87) PCT Pub. No.: WO2021/176807
PCT Pub. Date: Sep. 10, 2021

(65) Prior Publication Data
US 2023/0032211 A1 Feb. 2, 2023

(30) Foreign Application Priority Data

Mar. 2, 2020 (JP) ................. 2020-034748

(51) Int. Cl.
*B64C 29/00* (2006.01)
*B60F 5/02* (2006.01)
(Continued)

(52) U.S. Cl.
CPC ............ *B64C 29/0033* (2013.01); *B60F 5/02* (2013.01); *B64C 3/56* (2013.01); *B64U 50/19* (2023.01)

(58) Field of Classification Search
CPC ....... B64C 29/0033; B64C 3/56; B64U 50/19; B60F 5/02
See application file for complete search history.

(56) References Cited

U.S. PATENT DOCUMENTS 8,616,492 B2 * 12/2013 Oliver ................. B64C 29/0075
244/12.4
10,745,125 B2   8/2020 Kondo
(Continued)

FOREIGN PATENT DOCUMENTS

JP    2000-142379 A    5/2000
WO    2019/021521 A1   1/2019

OTHER PUBLICATIONS

International Search Report issued in PCT/JP2020/047854 dated Mar. 23, 2021 with English Translation (5 pages).
(Continued)

*Primary Examiner* — Tye William Abell
(74) *Attorney, Agent, or Firm* — Nakanishi IP Associates, LLC

(57) ABSTRACT

A floating moving device includes a first rotation unit, a second rotation unit, a third rotation unit, a fourth rotation unit, and a fifth rotation unit. A fourth adjustment unit adjusts a direction of a fourth impeller such that a rotation axis of the fourth impeller is parallel to at least an up-down direction at a takeoff time. A fifth adjustment unit adjusts a direction of a fifth impeller such that a rotation axis of the fifth impeller is parallel to the up-down direction at the takeoff time. A first adjustment unit adjusts a position of a first wheel such that the first wheel comes into contact with the ground until the takeoff is performed. A second adjustment unit adjusts a position of a second wheel such that the second wheel comes into contact with the ground until the takeoff is performed.

10 Claims, 19 Drawing Sheets

(51) Int. Cl.
  *B64C 3/56* (2006.01)
  *B64U 50/19* (2023.01)

(56) References Cited

U.S. PATENT DOCUMENTS

2017/0253333 A1\* 9/2017 Baudet ..................... B64C 1/30
2020/0094953 A1\* 3/2020 Kondo ................... B64C 37/00

OTHER PUBLICATIONS

Written Opinion of International Searching Authority issued in PCT/JP2020/047854 dated Mar. 23, 2021 with English Translation (5 pages).

\* cited by examiner

FLOATING MOVING DEVICE

TECHNICAL FIELD

The present invention relates to a floating moving device.

BACKGROUND ART

As described in Patent Literature 1, there has been proposed a floating automobile in which four propeller-type rollers are used.

CITATION LIST

Patent Literature

Patent Literature 1: JP 2000-142379 A

SUMMARY OF INVENTION

Technical Problem

However, since the floating automobile moves in a state in which wheels are in contact with the ground, it is not considered that the floating automobile moves in a floating state away from the ground.

Therefore, an object of the present invention is to provide a floating moving device capable of moving in a floating state in the air or on the water away from the ground.

Solution to Problem

A floating moving device according to the present invention includes: a first rotation unit including a first impeller, a first wheel, and a first adjustment unit; a second rotation unit including a second impeller, a second wheel, and a second adjustment unit; a third rotation unit including a third impeller, a third wheel, and a third adjustment unit; a fourth rotation unit including a fourth impeller and a fourth adjustment unit; and a fifth rotation unit including a fifth impeller and a fifth adjustment unit.

The fourth adjustment unit adjusts a direction of at least the fourth impeller such that a rotation axis of the fourth impeller is parallel to at least an up-down direction at a takeoff time.

The fifth adjustment unit adjusts a direction of at least the fifth impeller such that a rotation axis of the fifth impeller is parallel to at least the up-down direction at the takeoff time.

The first adjustment unit adjusts a position of at least the first wheel such that the first wheel comes into contact with a ground until the takeoff is performed.

The second adjustment unit adjusts a position of at least the second wheel such that the second wheel comes into contact with the ground until the takeoff is performed.

The third adjustment unit adjusts a position of at least the third wheel such that the third wheel comes into contact with the ground until the takeoff is performed and adjusts a direction of at least the third impeller such that a rotation axis of the third impeller is parallel to at least a front-rear direction when a water movement is performed.

The first rotation unit includes a left front rotation unit including the first impeller, the first wheel, and the first adjustment unit.

The second rotation unit includes a right front rotation unit including the second impeller, the second wheel, and the second adjustment unit.

The fourth rotation unit includes a left middle rotation unit including the fourth impeller and the fourth adjustment unit, the left middle rotation unit being provided behind the left front rotation unit.

The fifth rotation unit includes a right middle rotation unit including the fifth impeller and the fifth adjustment unit, the right middle rotation unit being provided behind the right front rotation unit.

By performing operation control for at least five rotation units, it becomes possible to realize a floating moving device capable of performing land movement, air movement, and water movement, that is, to move in a state of floating in the air and on the water away from the ground.

Preferably, the floating moving device further includes a hydrogen tank and an electric conversion unit that generates electricity based on hydrogen supplied from the hydrogen tank.

Electric power obtained by the electric conversion unit is supplied to the first rotation unit to the fifth rotation unit.

Hydrogen filled in the hydrogen tank is converted into electricity and the first rotation unit and the like are driven using the converted electricity. Since a large amount of hydrogen is filled in the hydrogen tank at the takeoff time, a specific gravity of the floating moving device decreases to make it easy for the floating moving device can to take off.

Further, the hydrogen tank can be also used as a float at the time of the water movement time.

More preferably, a pair of the hydrogen tanks is provided. The third rotation unit is provided between the two hydrogen tanks.

More preferably, the first adjustment unit adjusts a direction of at least the first impeller such that the rotation axis of the first impeller is parallel to at least the up-down direction when the air movement in a first flight mode or the water movement is performed.

The second adjustment unit adjusts a direction of at least the second impeller such that the rotation axis of the second impeller is parallel to at least the up-down direction when the air movement in the first flight mode or the water movement is performed.

An air movement including hovering is enabled.

Preferably, the fourth adjustment unit adjusts a direction of at least the fourth impeller such that the rotation axis of the fourth impeller is parallel to at least the front-rear direction when the air movement in a second flight mode is performed.

The fifth adjustment unit adjusts a direction of at least the fifth impeller such that the rotation axis of the fifth impeller is parallel to at least the front-rear direction when the air movement in the second flight mode is performed.

The first adjustment unit adjusts a direction of at least the first impeller such that the rotation axis of the first impeller is parallel to at least the front-rear direction and does not overlap with the fourth impeller when viewed from the front-rear direction when the air movement in the second flight mode is performed.

The second adjustment unit adjusts a direction of at least the second impeller such that the rotation axis of the second impeller is parallel to at least the front-rear direction and does not overlap with the fifth impeller when viewed from the front-rear direction when the air movement in the second flight mode is performed.

The third adjustment unit adjusts a direction of at least the third impeller such that the rotation axis of the third impeller is parallel to at least the front-rear direction when the air movement in the second flight mode is performed.

By driving the first impeller or the like to jet sucked gas or the like in the rear direction in a state where the rotation axes (the impellers) do not overlap in the front-rear direction, a fast air movement becomes possible.

More preferably, the fourth rotation unit includes a fourth wheel.

The fifth rotation unit includes a fifth wheel.

The fourth rotation unit includes a first transmission unit that transmits a first rotational force to the fourth impeller or the fourth wheel.

The fifth rotation unit includes a second transmission unit that transmits a second rotational force to the fifth impeller or the fifth wheel.

The first transmission unit transmits the first rotational force to the fourth impeller at the takeoff time and transmits the first rotational force to the fourth wheel at a land movement time.

The second transmission unit transmits the second rotational force to the fifth impeller at the takeoff time and transmits the second rotational force to the fifth wheel at the land movement time.

When the impellers are rotated, the rotation of the wheels can be stopped and, when the wheels are rotated, the rotation of the impellers can be stopped and operation control for the impellers and the wheels in a small load state becomes possible.

More preferably, the first rotation unit includes the left front rotation unit and a left rear rotation unit provided behind the left middle rotation unit.

Each of the left front rotation unit and the left rear rotation unit includes the first impeller, the first wheel, and the first adjustment unit.

The second rotation unit includes the right front rotation unit and a right rear rotation unit provided behind the right middle rotation unit.

Each of the right front rotation unit and the right rear rotation unit includes the second impeller, the second wheel, and the second adjustment unit.

The third rotation unit includes at least one of a front center rotation unit provided between the left front rotation unit and the right front rotation unit and a rear center rotation unit provided between the left rear rotation unit and the right rear rotation unit.

More preferably, the third rotation unit includes the front center rotation unit and the rear center rotation unit.

When the rotation axis of the impeller of the front center rotation unit and the rotation axis of the impeller of the rear center rotation unit operate in an overlapping positional relation, operation control is performed such that the impeller of the front center rotation unit and the impeller of the rear center rotation unit rotate in opposite directions.

The front center impeller and the rear center impeller can configure a double reversal fan.

Preferably, the first rotation unit includes the left front rotation unit and a left rear rotation unit provided behind the left middle rotation unit.

Each of the left front rotation unit and the left rear rotation unit includes the first impeller, the first wheel, and the first adjustment unit.

The second rotation unit includes the right front rotation unit and a right rear rotation unit provided behind the right middle rotation unit.

Each of the right front rotation unit and the right rear rotation unit includes the second impeller, the second wheel, and the second adjustment unit.

The third rotation unit includes a front center rotation unit provided between the left front rotation unit and the right front rotation unit and a rear center rotation unit provided between the left rear rotation unit and the right rear rotation unit.

When the air movement is performed in the second flight mode, the left middle impeller corresponding to the fourth impeller and included in the left middle rotation unit, the left front impeller corresponding to the first impeller and included in the left front rotation unit, and the left rear impeller corresponding to the first impeller and included in the left rear rotation unit are adjusted such that at least the rotation axes do not overlap.

When the air movement is performed in the second flight mode, the right middle impeller corresponding to the fifth impeller and included in the right middle rotation unit, the right front impeller corresponding to the second impeller and included in the right front rotation unit, and the right rear impeller corresponding to the second impeller and included in the right rear rotation unit are adjusted such that at least the rotation axes do not overlap.

Preferably, the third rotation unit includes a left rear rotation unit provided behind the left middle rotation unit and a right rear rotation unit provided behind the right middle rotation unit.

Each of the left rear rotation unit and the right rear rotation unit includes the third impeller, the third wheel, and the third adjustment unit.

The fourth rotation unit includes the left middle rotation unit.

The fifth rotation unit includes the right middle rotation unit.

As explained above, according to the present invention, it is possible to provide a floating moving device capable of moving in a floating state in the air or on the water away from the ground.

DESCRIPTION OF EMBODIMENTS

Figure 1:
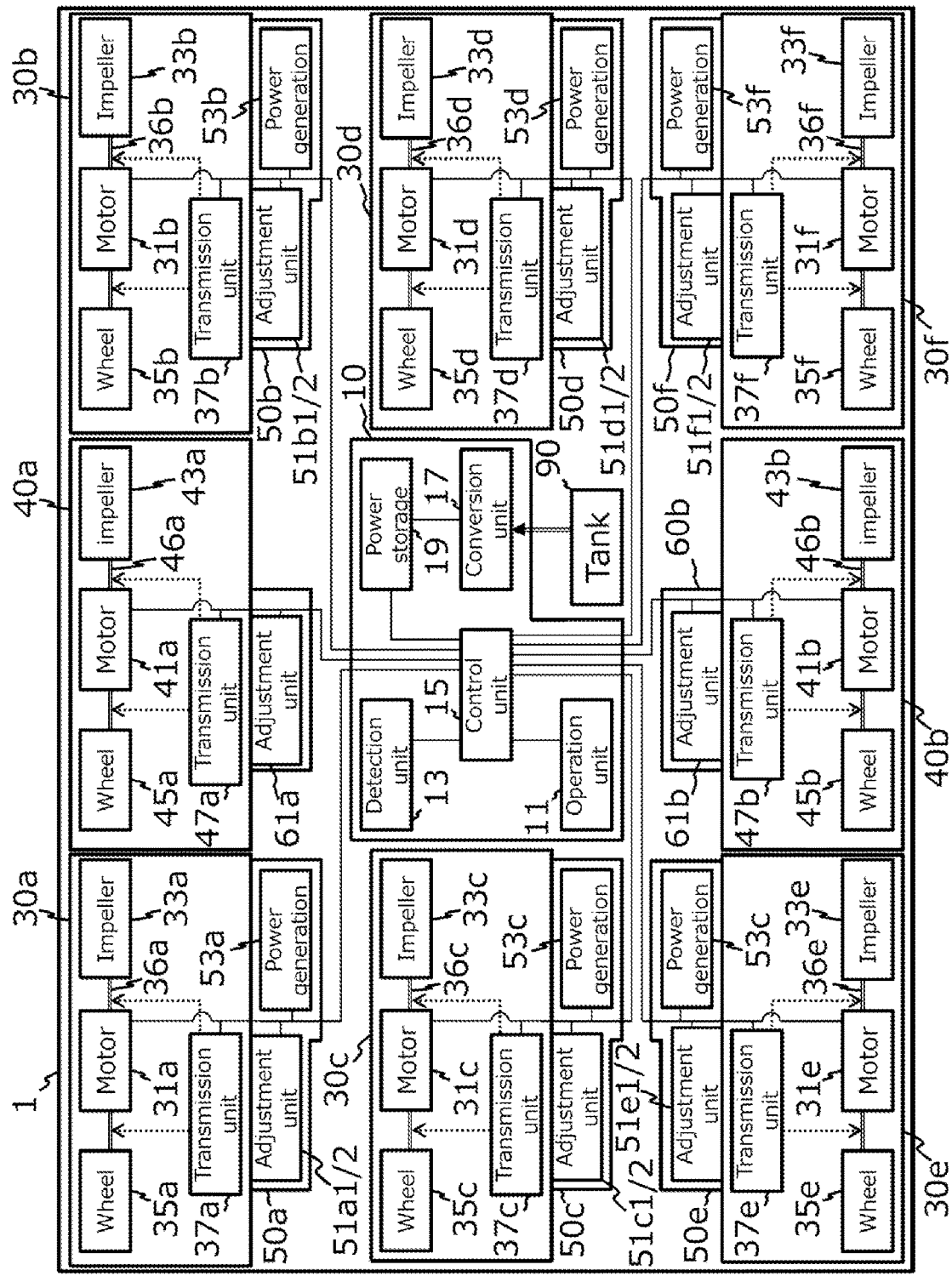
FIG. 1 is a block diagram illustrating each unit of a floating moving device in a first embodiment.

Embodiments are explained below with reference to the drawings.

Note that the embodiments are not limited to a first embodiment and a second embodiment explained below. In principle, content described in one embodiment is also applied to other embodiments in the same manner. The embodiments and modifications can be combined as appropriate.

A floating moving device 1 in the first embodiment (see FIGS. 1 to 10) and the second embodiment (see FIGS. 11 to 19) includes a driving unit 10, a rotation unit (a left front rotation unit 30a, a front center rotation unit 40a, and the like), a connection unit (a left front connection unit 50a, a front center connection unit 60a, and the like), and tanks 90.

In order to explain directions, a front-rear direction of the floating moving device 1 is explained as an x direction, a left-right direction perpendicular to the x direction is explained as a y direction, and a substantially vertical direction perpendicular to the x direction and the y direction is explained as a z direction.

Figure 2:
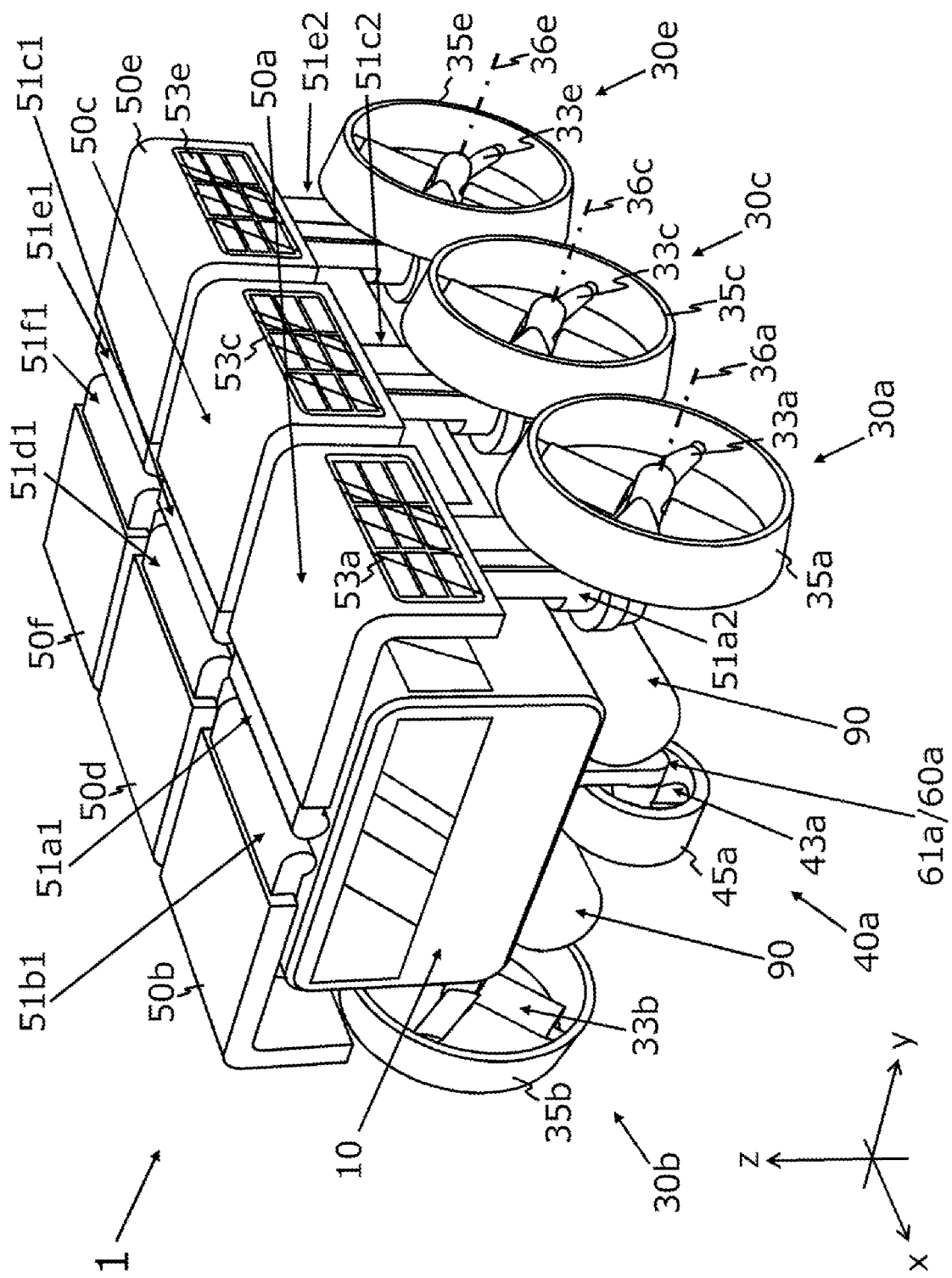
FIG. 2 is a perspective view of the floating moving device in a first state in the first embodiment viewed from the front and from above.

In FIG. 2, directions indicated by arrows of xyz axes are respectively defined as a forward direction, a left direction, and an upward direction.

(Driving Unit 10, Operation Unit 11)

A boarding space is provided inside the driving unit 10. An operation unit 11 for an occupant to operate the floating moving device 1 is provided in said boarding space.

Further, besides the operation unit 11, a detection unit 13, a control unit 15, an electric conversion unit 17, a power storage unit 19, and a platform 21 are provided in the driving unit 10.

(Detection Unit 13)

The detection unit 13 is provided, for example, on the outer side of the driving unit 10 and measures speed, an outside temperature, an altitude, an operation state, and the like.

(Control Unit 15)

The control unit 15 controls each unit of the floating moving device 1 based on operation performed using the operation unit 11 or information from the detection unit 13.

Details of the operation control by the control unit 15 are described later.

(Electrical Conversion Unit 17)

The electric conversion unit 17 causes hydrogen filled in the tanks 90 and oxygen in the air to react to generate electricity.

(Power Storage Unit 19)

The power storage unit 19, such as a storage battery, a capacitor, and a fuel cell, stores electric power obtained by the electric conversion unit 17 and electric power obtained by a power generation unit (a left front power generation unit 53a and the like) which will be described later and supplies the electric power to each unit of the floating moving device 1.

(Platform 21)

The platform 21 is provided on a side surface, a front surface, or a rear surface of the driving unit 10.

In the first embodiment, the platform 21 is provided on the side surface of the driving unit 10 and in the vicinity of the middle in the front-rear direction (the x direction).

Entry and exit between the outside of the floating moving device 1 and the boarding space of the driving unit 10 is performed via the platform 21.

(Rotation Units, Connection Units)

The rotation units are used for a land movement of the floating moving device 1, takeoff and landing and an air movement of the floating moving device 1, and a water movement of the floating moving device 1.

The rotation units in the first embodiment include the left front rotation unit 30a, a right front rotation unit 30b, a left middle rotation unit 30c, a right middle rotation unit 30d, a left rear rotation unit 30e, a right rear rotation unit 30f, the front center rotation unit 40a, and a rear center rotation unit 40b.

The connecting units in the first embodiment include the left front connection unit 50a, a right front connection unit 50b, a left middle connection unit 50c, a right middle connection unit 50d, a left rear connection unit 50e, a right rear connection unit 50f, the front center connection unit 60a, and a rear center connection unit 60b.

The left front rotation unit 30a and the left front connection unit 50a are provided on the left front when the floating moving device 1 is viewed from above.

The right front rotation unit 30b and the right front connection unit 50b are provided on the right front when the floating moving device 1 is viewed from above.

The left middle rotation unit 30c and the left middle connection unit 50c are provided on the left and in the middle in the front-rear direction (the x direction) when the floating moving device 1 is viewed from above (the rear of the left front rotation unit 30a and the front of the left rear rotation unit 30e).

The right middle rotation unit 30d and the right middle connection unit 50d are provided on the right and in the middle in the front-rear direction (the x direction) when the floating moving device 1 is viewed from above (the rear of the right front rotation unit 30b and the front of the right rear rotation unit 30f).

The left rear rotation unit 30e and the left rear connection unit 50e are provided on the left rear when the floating moving device 1 is viewed from above (the rear of the left middle rotation unit 30c).

The right rear rotation unit 30f and the right rear connection unit 50f are provided on the right rear when the floating moving device 1 is viewed from above (the rear of the right middle rotation unit 30d).

The front center rotation unit 40a and the front center connection unit 60a are provided in the middle in the left-right direction (the y direction) and in the front when the floating moving device 1 is viewed from above.

The rear center rotation unit 40b and the rear center connection unit 60b are provided in the middle in the left-right direction (the y direction) and in the rear when the floating moving device 1 is viewed from above.

The left front rotation unit 30*a* is attached to the driving unit 10 via the left front connection unit 50*a*.

The right front rotation unit 30*b* is attached to the driving unit 10 via the right front connection unit 50*b*.

The left middle rotation unit 30*c* is attached to the driving unit 10 via the left middle connection unit 50*c*.

The right middle rotation unit 30*d* is attached to the driving unit 10 via the right middle connection unit 50*d*.

The left rear rotation unit 30*e* is attached to the driving unit 10 via the left rear connection unit 50*e*.

The right rear rotation unit 30*f* is attached to the driving unit 10 via the right rear connection unit 50*f*.

The front center rotation unit 40*a* is attached to the driving unit 10 via the front center connection unit 60*a*.

The rear center rotation unit 40*b* is attached to the driving unit 10 via the rear center connection unit 60*b*.

The left front connection unit 50*a* is attached to the left front of the upper surface of the driving unit 10.

The right front connection unit 50*b* is attached to the right front of the upper surface of the driving unit 10.

The left middle connection unit 50*c* is attached to the left and the middle in the front-rear direction, of the upper surface of the driving unit 10.

The right middle connection unit 50*d* is attached to the right and the middle in the front-rear direction, of the upper surface of the driving unit 10.

The left rear connection unit 50*e* is attached to the left rear of the upper surface of the driving unit 10.

The right rear connection unit 50*f* is attached to the right rear of the upper surface of the driving unit 10.

The front center connection unit 60*a* is attached to the front center of the lower surface of the driving unit 10.

The rear center connection unit 60*b* is attached to the rear center of the lower surface of the driving unit 10.

(Left front rotation unit 30*a*) The left front rotation unit 30*a* includes a motor (a left front motor 31*a*), an impeller (a left front impeller 33*a*), a wheel (a left front wheel 35*a*), and a transmission unit (a left front transmission unit 37*a*).

The left front motor 31*a* is used to drive the left front impeller 33*a* and the left front wheel 35*a*.

The left front impeller 33*a* is configured by a propeller fan or the like and jets sucked gas or liquid in an axial direction.

In order to prevent a user from touching the left front impeller 33*a*, it is desirable that a net-like object (not illustrated) that covers at least a part of a suction region and a discharge region of the left front impeller 33*a* should be provided.

The suction region is a region where gas such as air or liquid such as water is sucked by the left front impeller 33*a*.

The discharge region is a region where gas or liquid sucked by the left front impeller 33*a* is discharged from the left front impeller 33*a*.

The left front wheel 35*a* is provided around a side portion of the left front impeller 33*a*.

The left front wheel 35*a* is used to enable the floating moving device 1 to move on the ground.

The left front wheel 35*a* has a substantially hollow cylindrical shape, an upper surface of the substantially hollow cylindrical shape is present in an intake region of the left front impeller 33*a*, a lower surface of the substantially hollow cylindrical shape is present in an exhaust region of the left front impeller 33*a*, and a side surface of the substantially hollow cylindrical shape covers the left front impeller 33*a*.

The side surface of the substantially hollow cylindrical shape configuring the left front wheel 35*a* is formed by an elastic member such as rubber.

When the floating moving device 1 comes into contact with the ground, the side surface of the substantially hollow cylindrical shape is deformed according to unevenness of the ground.

The inclination of blades of the left front impeller 33*a* is desirably capable of fluctuating according to an amount of gas or liquid to be discharged.

For example, based on the control by the control unit 15, the blades of the left front impeller 33*a* are inclined such that an angle formed by the blades and the upper surface of the substantially hollow cylindrical shape configuring the left front wheel 35*a* decreases or inclined such that said formed angle increases.

The left front transmission unit 37*a* is a power transmission device such as a clutch or a transmission.

The left front transmission unit 37*a* is provided between the left front motor 31*a* and the left front impeller 33*a* and between the left front motor 31*a* and the left front wheel 35*a* and controls power transmission from the left front motor 31*a* to the left front impeller 33*a* and power transmission from the left front motor 31*a* to the left front wheel 35*a*.

Specifically, the rotational force of the left front motor 31*a* is transmitted to the left front impeller 33*a* or the left front wheel 35*a* by the left front transmission unit 37*a*.

For example, when the left front wheel 35*a* is used at the land movement or the like, the rotational force of the left front motor 31*a* is transmitted to the left front wheel 35*a* via the left front transmission unit 37*a*.

When the left front impeller 33*a* is used at takeoff and landing, the air movement, the water movement, or the like, the rotational force of the left front motor 31*a* is transmitted to the left front impeller 33*a* via the left front transmission unit 37*a*.

(Right Front Rotation Unit 30*b*, Left Middle Rotation Unit 30*c*, Right Middle Rotation Unit 30*d*, Left Rear Rotation Unit 30*e*, Right Rear Rotation Unit 30*f*)

Like the left front rotation unit 30*a*, the right front rotation unit 30*b* includes a motor (a right front motor 31*b*), an impeller (a right front impeller 33*b*), a wheel (a right front wheel 35*b*), and a transmission unit (a right front transmission unit 37*b*).

Like the left front rotation unit 30*a*, the left middle rotation unit 30*c* includes a motor (a left middle motor 31*c*), an impeller (a left middle impeller 33*c*), a wheel (a left middle wheel 35*c*), and a transmission unit (a left middle transmission unit 37*c*).

Like the left front rotation unit 30*a*, the right middle rotation unit 30*d* includes a motor (a right middle motor 31*d*), an impeller (a right middle impeller 33*d*), a wheel (a right middle wheel 35*d*), and a transmission unit (a right middle transmission unit 37*d*).

Like the left front rotation unit 30*a*, the left rear rotation unit 30*e* includes a motor (a left rear motor 31*e*), an impeller (a left rear impeller 33*e*), a wheel (a left rear wheel 35*e*), and a transmitting unit (a left rear transmission unit 37*e*).

Like the left front rotation unit 30*a*, the right rear rotation unit 30*f* includes a motor (a right rear motor 31*f*), an impeller (a right rear impeller 33*f*), a wheel (a right rear wheel 35*f*), and a transmission unit (a right rear transmission unit 37*f*).

(Front Center Rotation Unit 40*a*, Rear Center Rotation Unit 40*b*)

Like the left front rotation unit 30*a*, the front center rotation unit 40*a* includes a motor (a front center motor 41*a*), an impeller (a front center impeller 43a), a wheel (a front center wheel 45a), and a transmission unit (a front center transmission unit 47a).

Like the left front rotation unit 30a, the rear center rotation unit 40b includes a motor (a rear center motor 41b), an impeller (a rear center impeller 43b), a wheel (a rear center wheel 45b), and a transmission unit (a rear center transmission unit 47b).

The connection units are provided between the driving unit 10 and the rotation units and are used to adjust a positional relation between the driving unit 10 and each of the rotation units (in particular, the direction of the impellers and the wheels).

Figure 3:
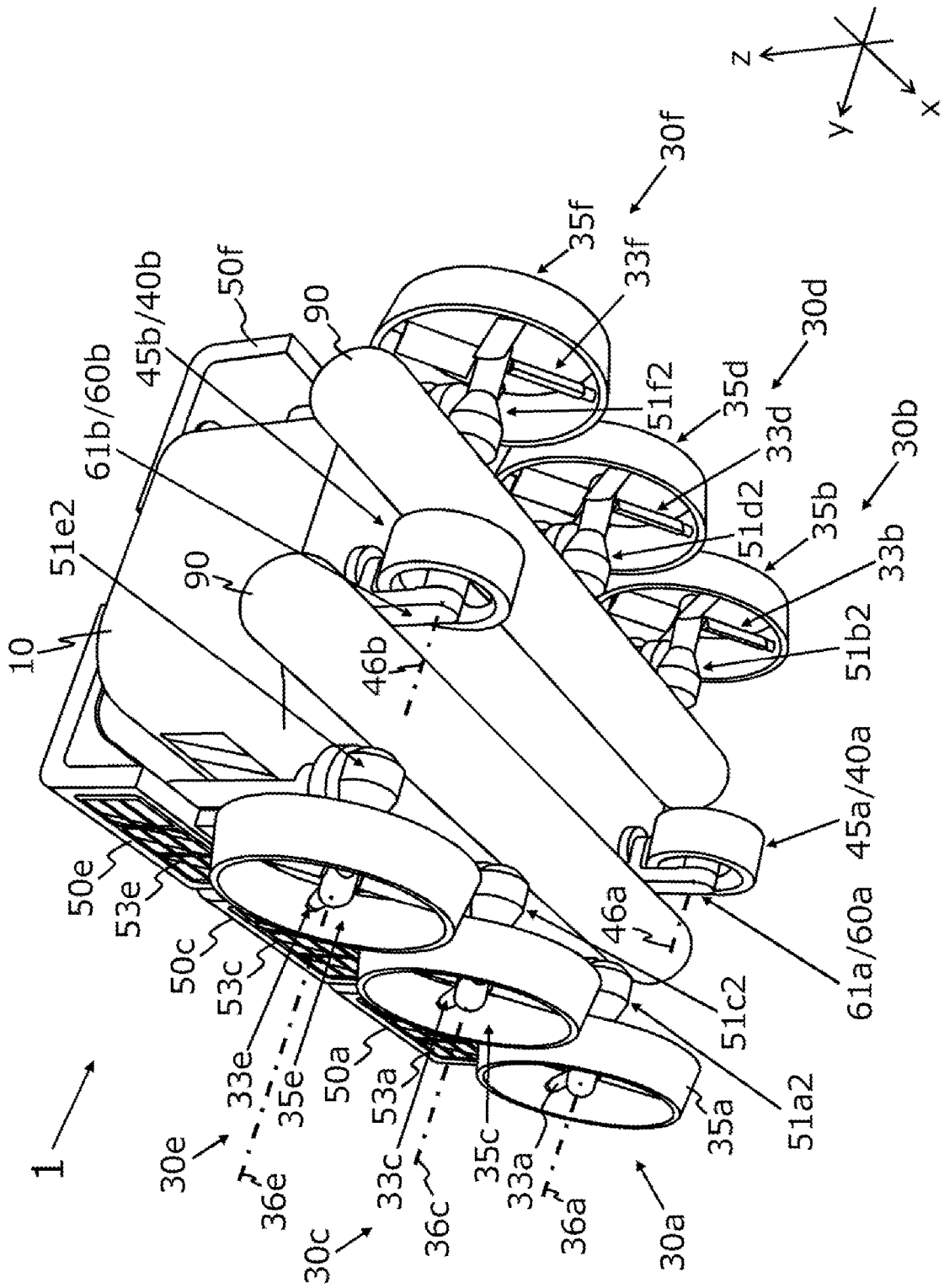
FIG. 3 is a perspective view of the floating moving device in the first state in the first embodiment viewed from the rear and from below.

A positional relation in traveling on the land is set as a first state (see FIGS. 2 and 3).

Figure 4:
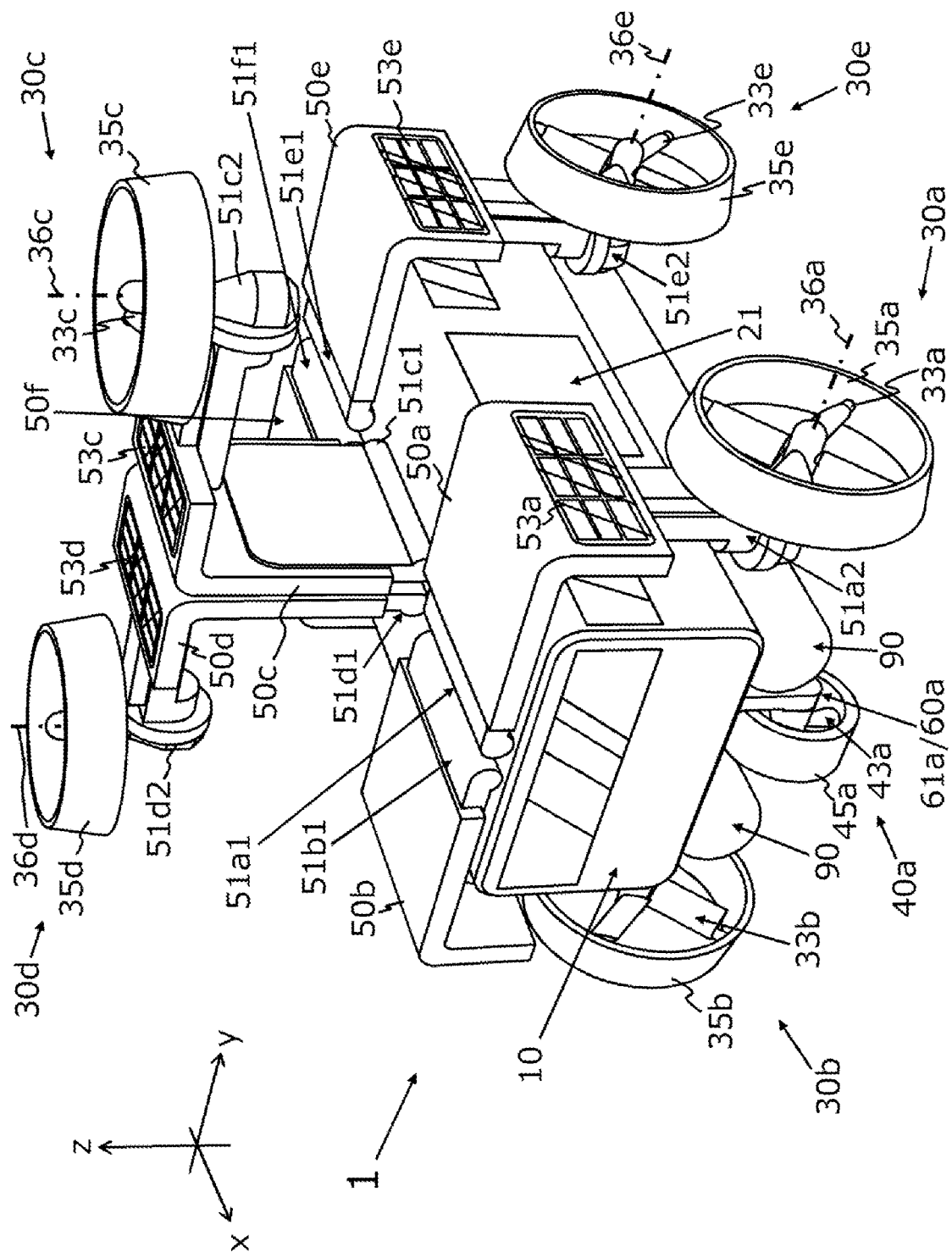
FIG. 4 is a perspective view of the floating moving device in a second state in the first embodiment.

A positional relation in getting on and off and takeoff and landing is set as a second state (see FIG. 4).

Figure 5:
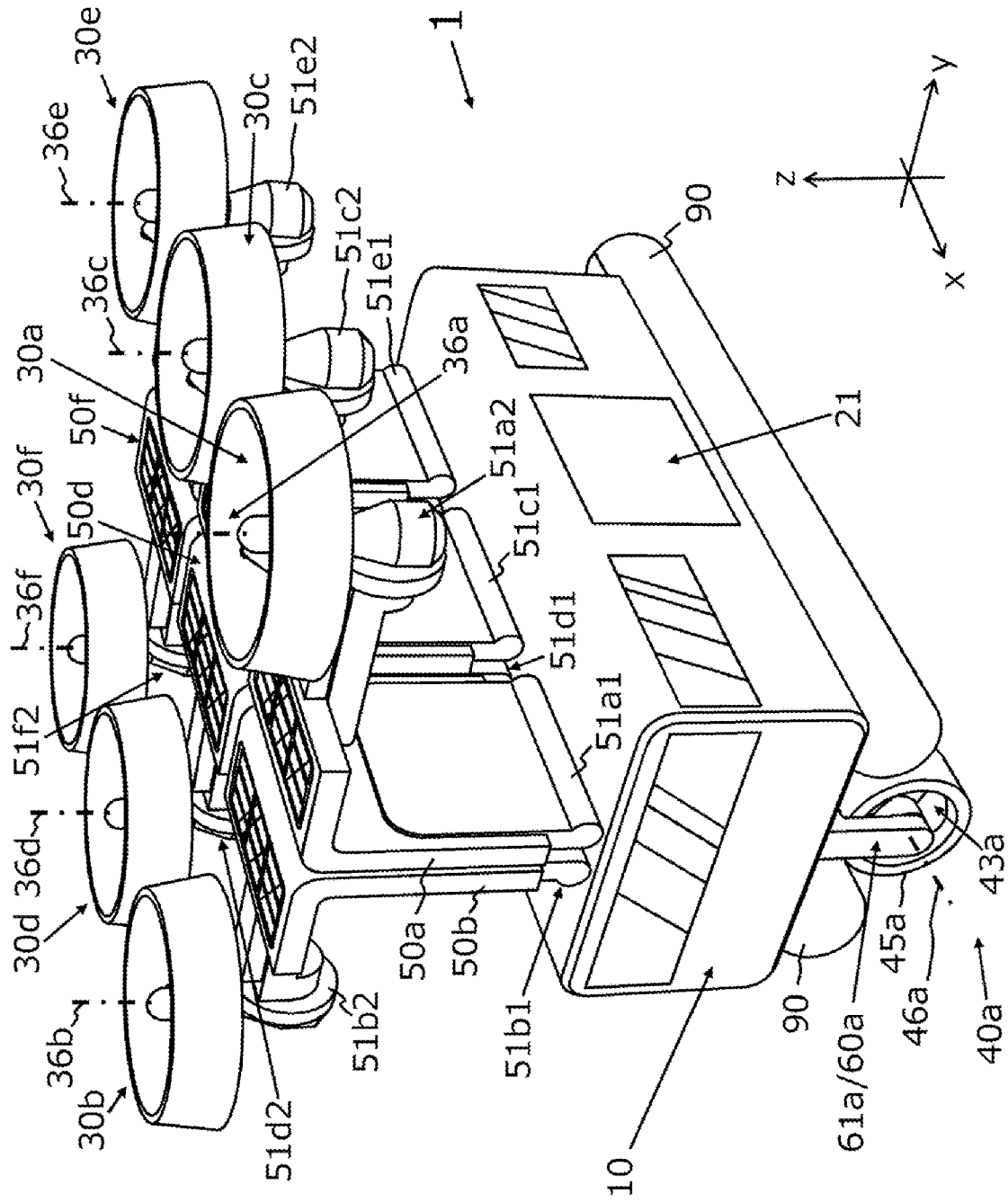
FIG. 5 is a perspective view of the floating moving device in a third state in the first embodiment.

One of positional relations (a first flight mode) during flight is set as a third state (see FIG. 5).

Figure 6:
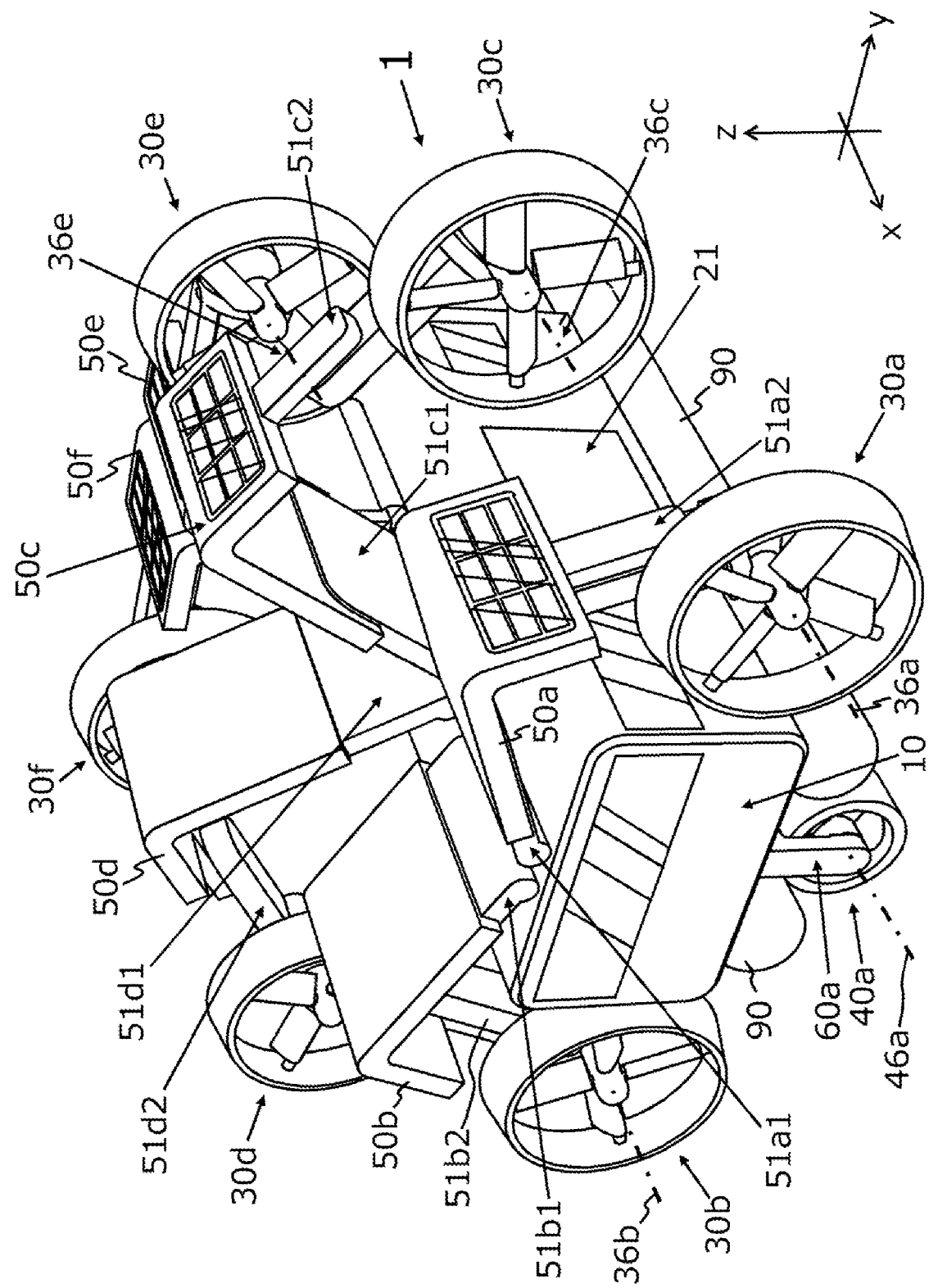
FIG. 6 is a perspective view of the floating moving device in a fourth state in the first embodiment viewed from the front and from above.
Figure 7:
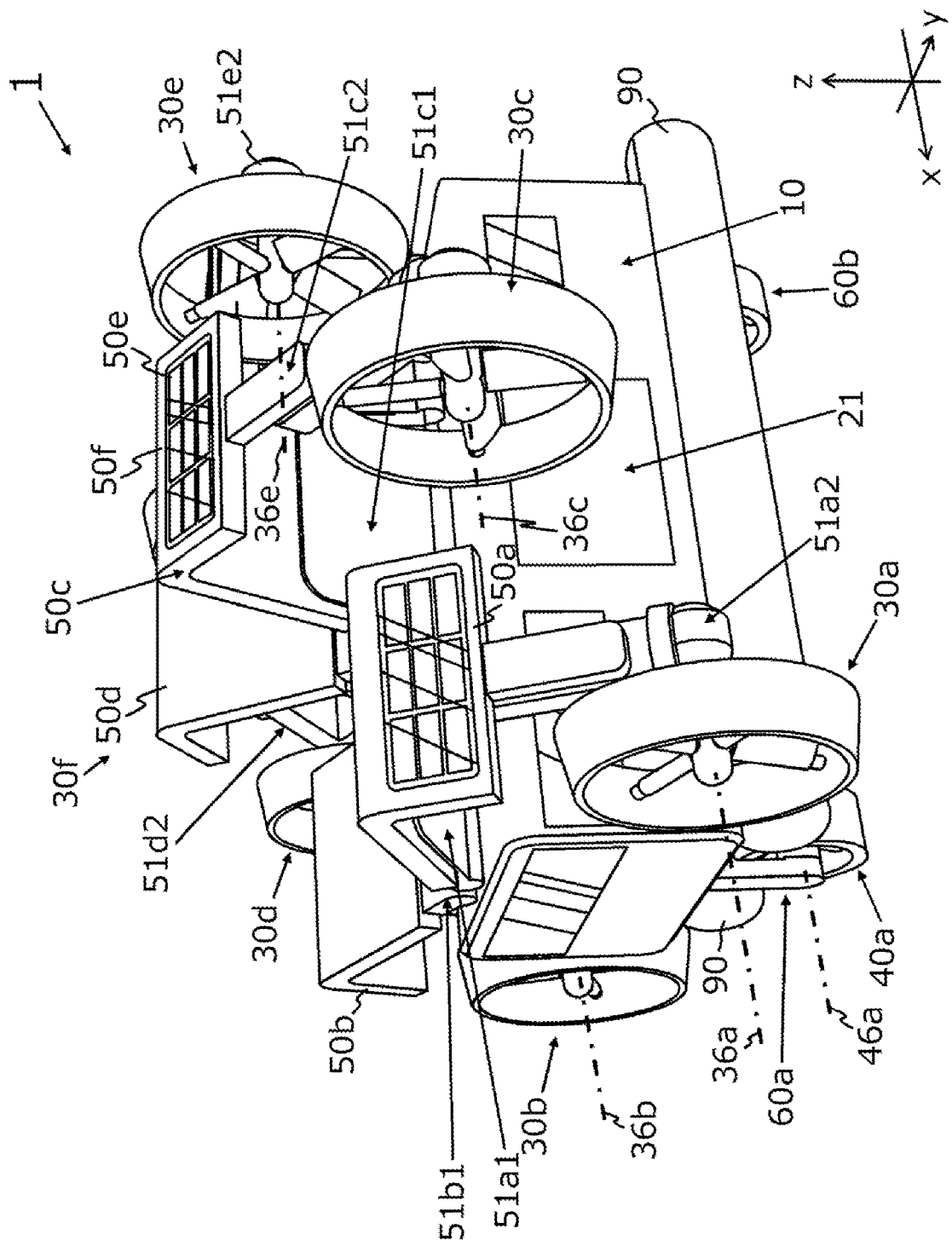
FIG. 7 is a perspective view further viewed from a side than FIG. 6.
Figure 8:
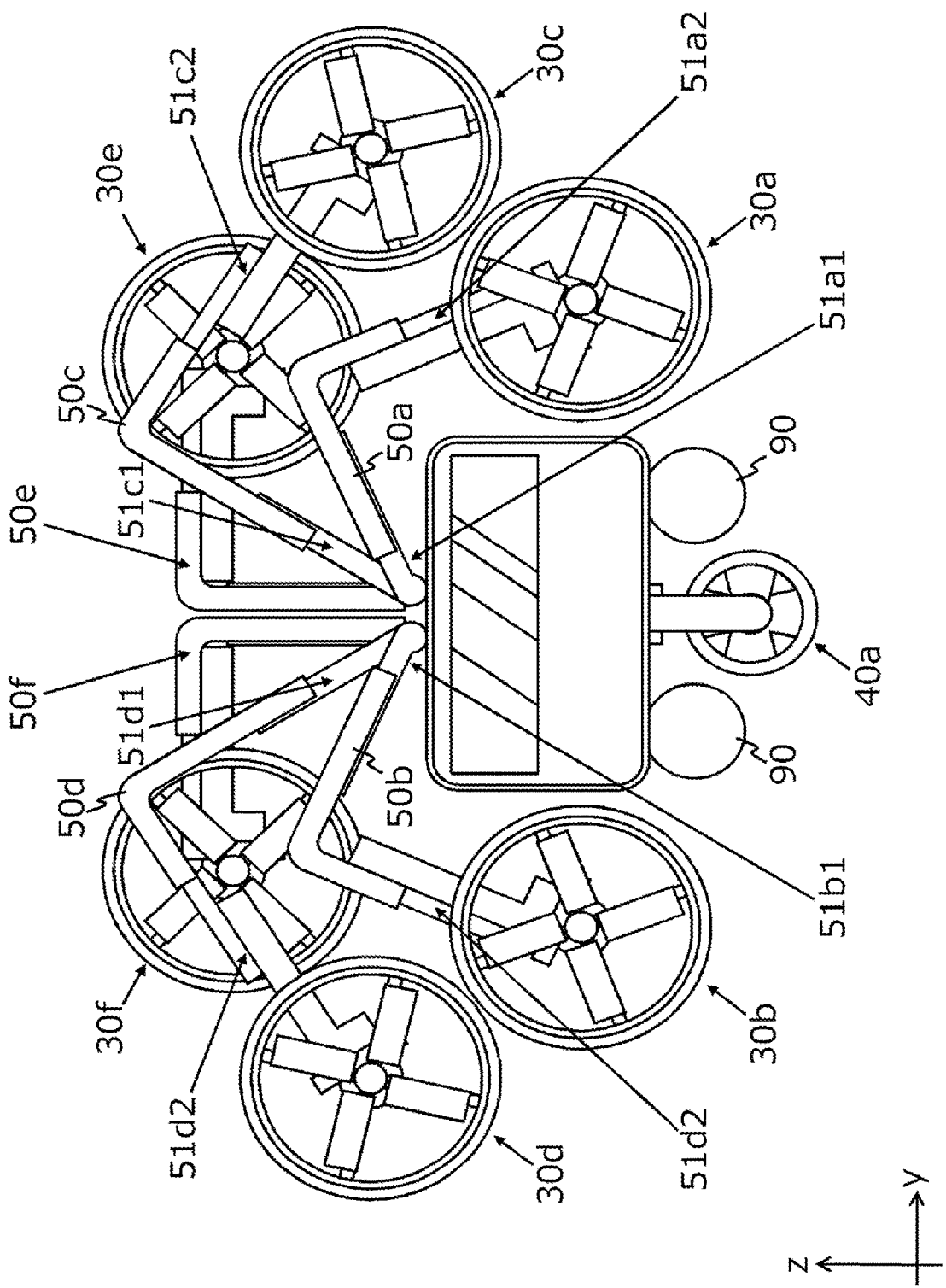
FIG. 8 is a front view of the floating moving device in the fourth state in the first embodiment viewed from the front.

The other of the positional relations (a second flight mode) during the flight is set as a fourth state (see FIGS. 6, 7, and 8).

Figure 9:
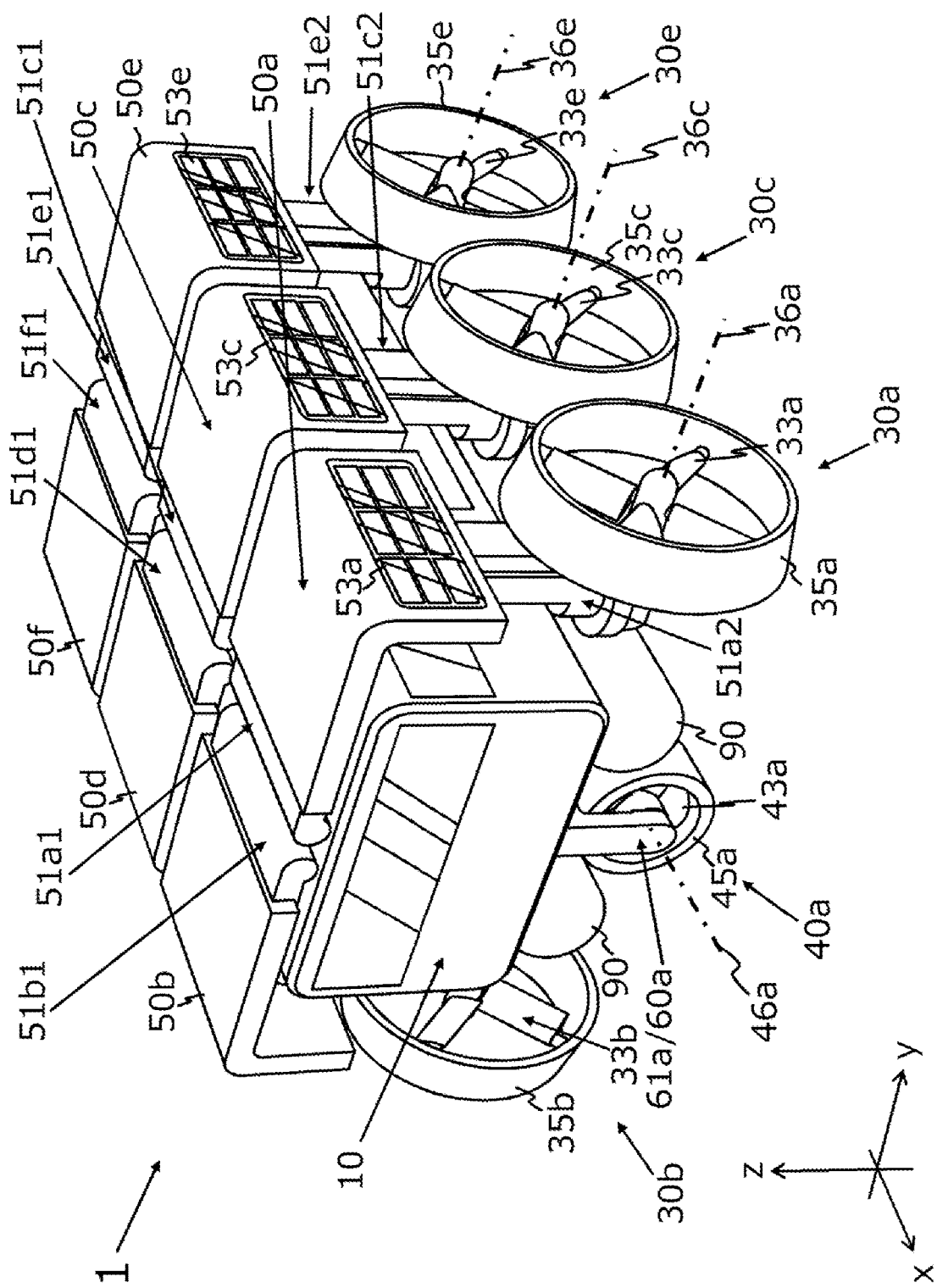
FIG. 9 is a perspective view of the floating moving device in a fifth state in the first embodiment viewed from the front and from above.
Figure 10:
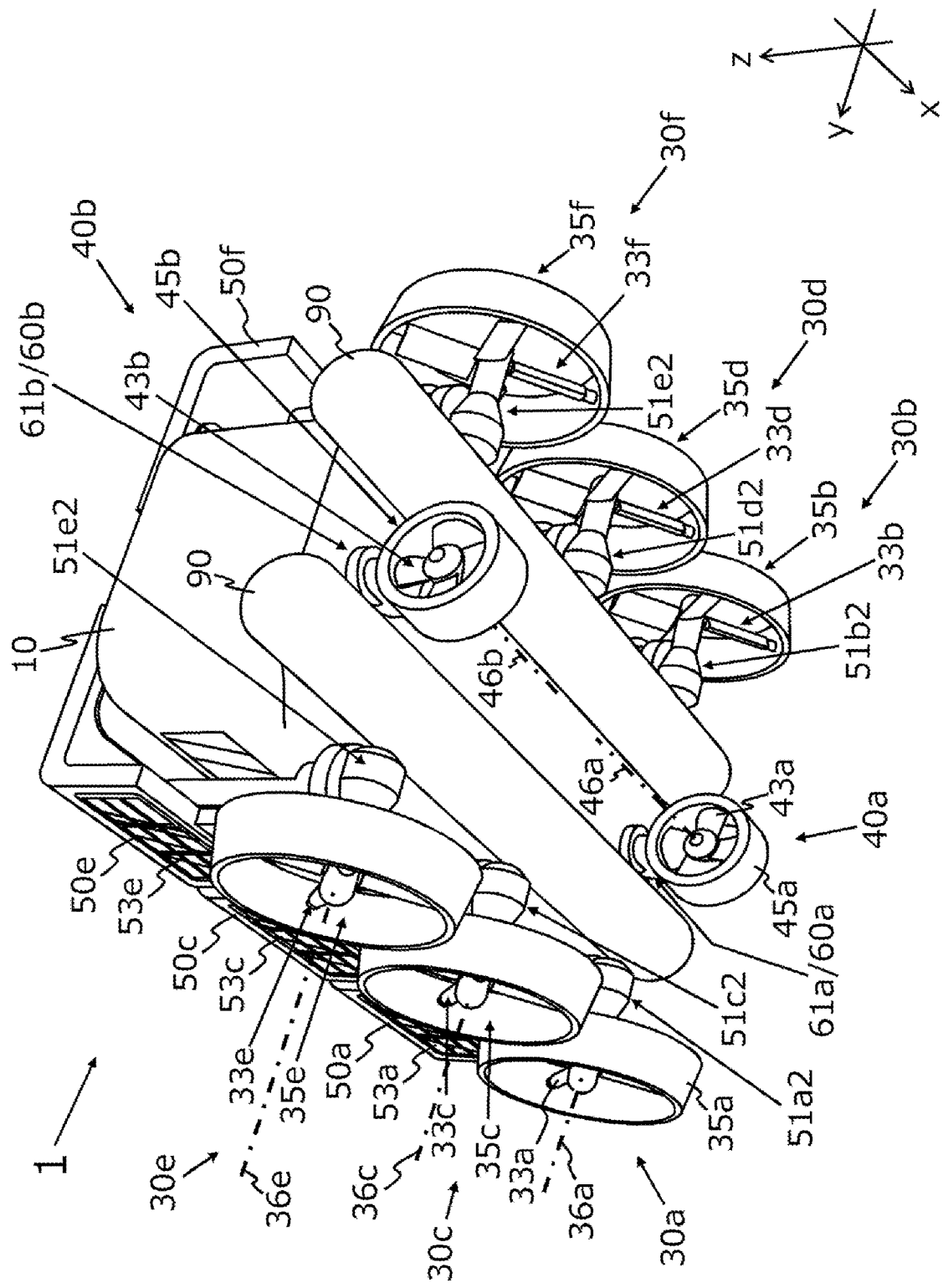
FIG. 10 is a perspective view of the floating moving device in the fifth state in the first embodiment viewed from the rear and from below.
Figure 11:
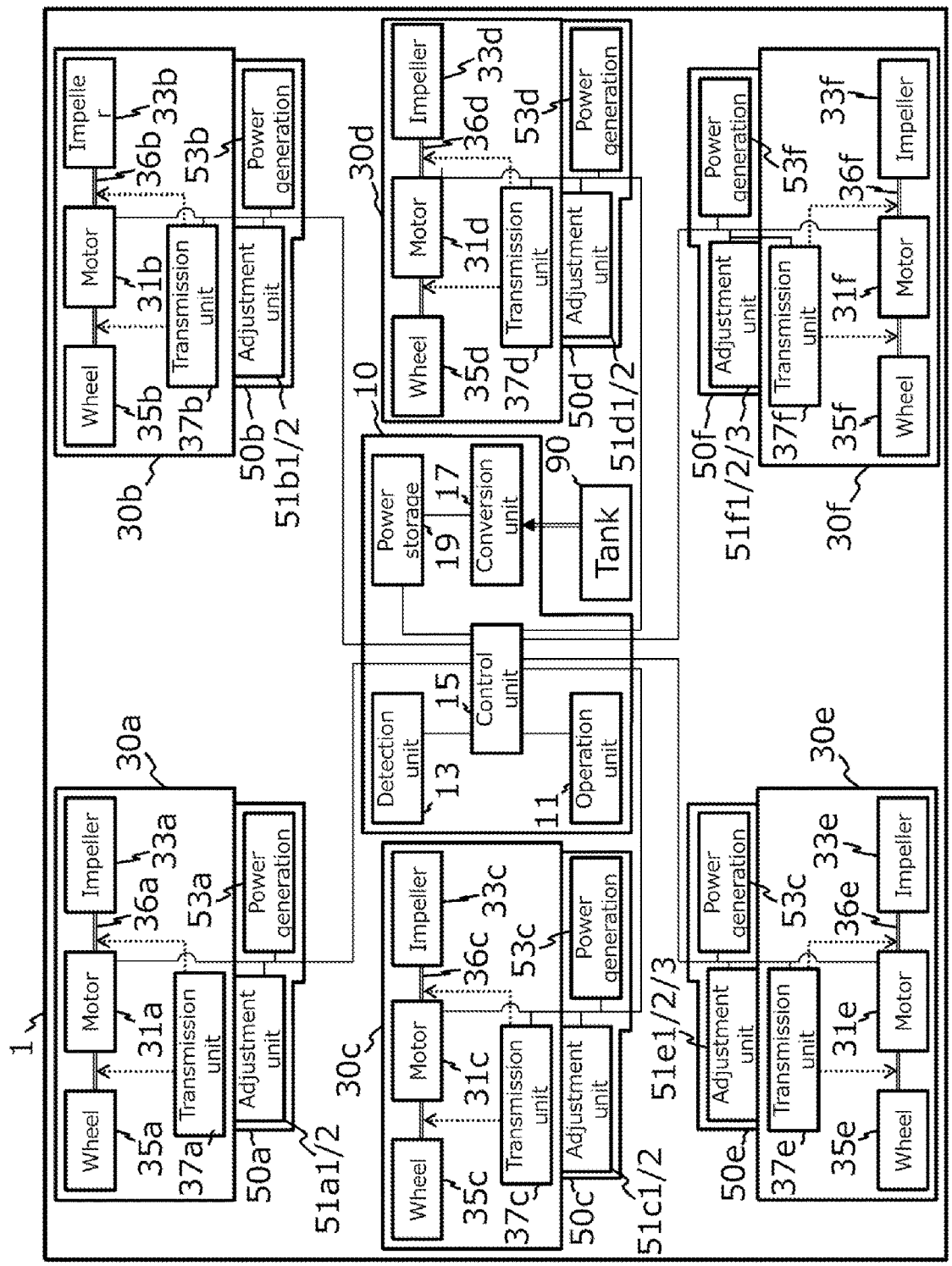
FIG. 11 is a block diagram illustrating each unit of a floating moving device in a second embodiment.

A positional relation in moving on water is set as a fifth state (see FIGS. 9 and 10).

(Left Front Connection Unit 50a)

The left front connection unit 50a includes an adjustment unit (a left front primary adjustment unit 51a1 and a left front secondary adjustment unit 51a2) and a power generation unit (the left front power generation unit 53a).

A housing of the left front connection unit 50a has a substantially L shape when viewed from the x direction.

One side of said substantially L shape has a surface perpendicular to the z direction and faces a part of the upper surface of the driving unit 10, in the first state.

The other side of said substantially L shape has a surface perpendicular to the y direction and faces a part of the side surface of the driving unit 10, in the first state.

An end portion of the one side of said substantially L shape is attached to the upper surface of the driving unit 10 via the left front primary adjustment unit 51a1.

An end portion of the other side of said substantially L shape is attached to the left front rotation unit 30a via the left front secondary adjustment unit 51a2.

The left front primary adjustment unit 51a1 holds the left front rotation unit 30a and a portion other than the left front primary adjustment unit 51a1 of the left front connection unit 50a in a movable state with respect to the driving unit 10.

Specifically, the left front primary adjustment unit 51a1 holds the left front rotation unit 30a and the portion other than the left front primary adjustment unit 51a1 of the left front connection unit 50a in a state in which the left front rotation unit 30a and the portion other than the left front primary adjustment unit 50a1 of the left front connection unit 50a are rotatable around a first axis parallel to the x direction and a distance (a first distance d1) between said first axis and the left front rotation unit 30a and the portion other than the left front primary adjustment unit 51a1 of the left front connection unit 50a is variable.

The left front secondary adjustment unit 51a2 holds the left front rotation unit 30a in a state in which the left front rotation unit 30a is rotatable around a second axis variable from a state parallel to the z direction to a state parallel to the y direction and a distance (a second distance d2) between and the left front rotation unit 30a and a portion other than the left front secondary adjustment unit 51a2 of the left front connection unit 50a can be changed.

In the first state, the dimensions of each unit are set such that the lower end of the left front rotation unit 30a is located below the lower ends of the tanks 90 and is in contact with the ground in a state in which the left front secondary adjustment unit 51a2 contracts.

The left front secondary adjustment unit 51a2 may be provided with a member such as a shock absorber that absorbs an impact received by the left front rotation unit 30a from the ground or the like.

For example, in the first state (see FIGS. 2 and 3), the rotation axis (the second axis) of the left front secondary adjustment unit 51a2 becomes parallel to the z direction and the left front connection unit 51a holds the left front rotation unit 30a such that the rotation axis of the left front impeller 33a and the left front wheel 35a is substantially parallel to the y direction.

Further, in the third state (see FIG. 5), the rotation axis (the second axis) of the left front secondary adjustment unit 51a2 becomes parallel to the y direction and the left front connection unit 51a holds the left front rotation unit 30a such that the rotation axis of the left front impeller 33a and the left front wheel 35a is substantially parallel to the z direction.

Therefore, the left front rotation unit 30a is held by the left front primary adjustment unit 51a1 and the left front secondary adjustment unit 51a2 in a state in which a rotation axis 36a of the left front impeller 33a and the like can face various directions.

The left front power generation unit 53a is a power generation device that performs solar power generation and is provided on the outer surface of the housing of the left front connection unit 50a.

In the first embodiment, an example is explained in which the left front power generation unit 53a is provided on outer surface of the other side of the substantially L shape of the left front connection unit 50a.

Electric power obtained by the left front power generation unit 53a is stored in the power storage unit 19.

(Right Front Connection Unit 50b, Left Middle Connection Unit 50c, Right Middle Connection Unit 50d, Left Rear Connection Unit 50e, Right Rear Connection Unit 50f)

Like the left front connection unit 50a, the right front connection unit 50b includes adjustment units (a right front primary adjustment unit 51b1, a right front secondary adjustment unit 51b2) and a power generation unit (a right front power generation unit 53b).

Like the left front connection unit 50a, the left middle connection unit 50c includes adjustment units (a left middle primary adjustment unit 51c1, a left middle secondary adjustment unit 51c2) and a power generation unit (a left middle power generation unit 53c).

Like the left front connection unit 50a, the right middle connection unit 50d includes adjustment units (a right middle primary adjustment unit 51d1, a right middle secondary adjustment unit 51d2) and a power generation unit (a right middle power generation unit 53d).

Like the left front connection unit 50a, the left rear connection unit 50e includes adjustment units (a left rear primary adjustment unit 51e1, a left rear secondary adjustment unit 51e2) and a power generation unit (a left rear power generation unit 53e).

Like the left front connection unit 50a, the right rear connection unit 50f includes adjustment units (a right rear primary adjustment unit 51f1, a right rear secondary adjustment unit 51f2) and a power generation unit (a right rear power generation unit 53f).

(Front Center Connection Unit 60*a*)

The front center connection unit 60*a* includes an adjustment unit (a front center adjustment unit 61*a*).

The front center connection unit 60*a* is attached between the two tanks 90 on the lower surface of the driving unit 10.

The front center adjustment unit 61*a* holds the front center rotation unit 40*a* in a movable state with respect to the driving unit 10.

Specifically, the front center adjustment unit 61*a* holds the front center rotation unit 40*a* in a state in which the front center rotation unit 40*a* is rotatable around an axis (a third axis) parallel to the z direction.

The dimensions of each unit are set such that the lower end of the front center rotation unit 40*a* is located below the lower ends of the tanks 90 and such that the lower end of the front center rotation unit 40*a* is in contact with the ground in the first state.

The front center adjustment unit 61*a* may be provided with a member such as a shock absorber that absorbs an impact received by the front center rotation unit 40*a* from the ground or the like.

(Rear Center Connection Unit 60*b*)

Like the front center connection unit 60*a*, the rear center connection unit 60*b* includes an adjustment unit (a rear center adjustment unit 61*b*).

(Tanks 90)

The tanks 90 stores hydrogen in a gaseous state.

Two tanks 90 extending in the x direction are attached to the lower surface of the driving unit 10 side by side in the y direction.

The hydrogen charged in the tanks 90 is converted into electric power by the electric conversion unit 17 and used for driving of the left front motor 31*a* and the like.

(Operation Control in the First State, Land Stationary)

When the floating moving device 1 is stationary on the land, the control unit 15 controls each unit such that the floating moving device 1 comes into the first state (see FIGS. 1 and 2).

Specifically, the control unit 15 causes the adjustment units (the left front primary adjustment unit 51*a*1, the left front secondary adjustment unit 51*a*2) of the left front connection unit 50*a* to operate such that the rotation axis 36*a* of the left front impeller 33*a* is substantially parallel to the y direction, and the left front wheel 35*a* is in contact with the ground.

That is, the left front primary adjustment unit 51*a*1 and the left front secondary adjustment unit 51*a*2 adjust the positions and directions of the left front impeller 33*a* and the left front wheel 35*a* such that the rotation axis 36*a* of the left front impeller 33*a* and the left front wheel 35*a* is substantially parallel to at least the left-right direction.

Further, the control unit 15 causes the adjustment units (the right front primary adjustment unit 51*b*1, the right front secondary adjustment unit 51*b*2) of the right front connection unit 50*b* to operate such that a rotation axis 36*b* of the right front impeller 33*b* is substantially parallel to the y direction and the right front wheel 35*b* is in contact with the ground.

That is, the right front primary adjustment unit 51*b*1 and the right front secondary adjustment unit 51*b*2 adjust the positions and directions of the right front impeller 33*b* and the right front wheel 35*b* such that the rotation axis 36*b* of the right front impeller 33*b* and the right front wheel 35*b* is substantially parallel to at least the left-right direction.

Further, the control unit 15 causes the adjustment units (the left middle primary adjustment unit 51*c*1, the left middle secondary adjustment unit 51*c*2) of the left middle connection unit 50*c* to operate such that a rotation axis 36*c* of the left middle impeller 33*c* is substantially parallel to the y direction and the left middle wheel 35*c* is in contact with the ground.

That is, the left middle primary adjustment unit 51*c*1 and the left middle secondary adjustment unit 51*c*2 adjust the positions and direction of the left middle impeller 33*c* and the left middle wheel 35*c* such that the rotation axis 36*c* of the left middle impeller 33*c* and the left middle wheel 35*c* is substantially parallel to at least the left-right direction.

Further, the control unit 15 causes the adjustment units (the right middle primary adjustment unit 51*d*1, the right middle secondary adjustment unit 51*d*2) of the right middle connection unit 50*d* to operate such that a rotation axis 36*d* of the right middle impeller 33*d* is substantially parallel to the y direction and the right middle wheel 35*d* is in contact with the ground.

That is, the right middle primary adjustment unit 51*d*1 and the right middle secondary adjustment unit 51*d*2 adjust the positions and directions of the right middle impeller 33*d* and the right middle wheel 35*d* such that the rotation axis 36*d* of the right middle impeller 33*d* and the right middle wheel 35*d* is substantially parallel to at least the left-right direction.

Further, the control unit 15 causes the adjustment units (the left rear primary adjustment unit 51*e*1, the left rear secondary adjustment unit 51*e*2) of the left rear connection unit 50*e* to operate such that a rotation axis 36*e* of the left rear impeller 33*e* is substantially parallel to the y direction and the left rear wheel 35*e* is in contact with the ground.

That is, the left rear primary adjustment unit 51*e*1 and the left rear secondary adjustment unit 51*e*2 adjust the positions and directions of the left rear impeller 33*e* and the left rear wheel 35*e* such that the rotation axis 36*e* of the left rear impeller 33*e* and the left rear wheel 35*e* is substantially parallel to at least the left-right direction.

Further, the control unit 15 causes the adjustment units (the right rear primary adjustment unit 51*f*1, the right rear secondary adjustment unit 51*f*2) of the right rear connection unit 50*f* to operate such that a rotation axis 36*f* of the right rear impeller 33*f* is substantially parallel to the y direction and the right rear wheel 35*f* is in contact with the ground.

That is, the right rear primary adjustment unit 51*f*1 and the right rear secondary adjustment unit 51*f*2 adjust the positions and directions of the right rear impeller 33*f* and the right rear wheel 35*f* such that the rotation axis 36*f* of the right rear impeller 33*f* and the right rear wheel 35*f* is substantially parallel to at least the left-right direction.

Further, the control unit 15 causes the adjustment unit (the front center adjustment portion 61*a*) of the front center connection unit 60*a* to operate such that a rotation axis 46*a* of the front center impeller 43*a* is substantially parallel to the y direction and the front center wheel 45*a* is in contact with the ground.

That is, the front center adjustment unit 61*a* adjusts the directions of the front center impeller 43*a* and the front center wheel 45*a* such that the rotation axis 46*a* of the front center impeller 43*a* and the front center wheel 45*a* is substantially parallel to at least the left-right direction.

Further, the control unit 15 causes the adjusting unit (the rear center adjustment unit 61*b*) of the rear center connection unit 60*b* to operate such that a rotation axis 46*b* of the rear center impeller 43*b* is substantially parallel to the y direction and the rear center wheel 45*b* is in contact with the ground.

That is, the rear center adjustment unit 61*b* adjusts the directions of the rear center impeller 43*b* and the rear center wheel 45*b* such that the rotation axis 46*b* of the rear center impeller 43b and the rear center wheel 45b is substantially parallel to at least the left-right direction.

The lower ends of the rotation units (the left front rotation unit 30a, the right front rotation unit 30b, the left middle rotation unit 30c, the right middle rotation unit 30d, the left rear rotation unit 30e, the right rear rotation unit 30f, the front center rotation unit 40a, the rear center rotation unit 40b) is located below the lower ends of the tanks 90.

The platform 21 on the left side becomes in a state in which being covered with the left middle rotation unit 30c and the left middle connection unit 50c.

The platform 21 on the right side becomes in a state in which being covered with the right middle rotation unit 30d and the right middle connection unit 50d.

(Operation Control in the First State, Land Movement)

When the floating moving device 1 moves on the land, the control unit 15 further rotates the left front motor 31a and causes the left front transmission unit 37a to operate such that the rotational force of the left front motor 31a is transmitted to the left front wheel 35a.

Further, the control unit 15 rotates the right front motor 31b and causes the right front transmission unit 37b to operate such that the rotational force of the right front motor 31b is transmitted to the right front wheel 35b.

Further, the control unit 15 rotates the left middle motor 31c and causes the left middle transmission unit 37c to operate such that the rotational force of the left middle motor 31c is transmitted to the left middle wheel 35c.

Further, the control unit 15 rotates the right middle motor 31d and causes the right middle transmission unit 37d to operate such that the rotational force of the right middle motor 31d is transmitted to the right middle wheel 35d.

Further, the control unit 15 rotates the left rear motor 31e and causes the left rear transmission unit 37e to operate such that the rotational force of the left rear motor 31e is transmitted to the left rear wheel 35e.

Further, the control unit 15 rotates the right rear motor 31f and causes the right rear transmission unit 37f to operate such that the rotational force of the right rear motor 31f is transmitted to the right rear wheel 35f.

Further, the control unit 15 rotates the front center motor 41a.

Further, the control unit 15 rotates the rear center motor 41b.

However, some motors among the left front motor 31a, the right front motor 31b, the left middle motor 31c, the right middle motor 31d, the left rear motor 31e, and the right rear motor 31f may be stopped and only the remaining motors may be driven.

The floating moving device 1 moves on the land according to the rotation of the wheels (the left front wheel 35a and the like).

By adjusting a rotation amount of the wheels (the left front wheel 35a and the like), the floating moving device 1 can be moved not only on a linear track in the front-rear direction but also by being bent in the left-right direction.

Further, the secondary adjustment units (the left front secondary adjustment unit 51a2 and the like) change the rotation axes of the wheels (the left front wheel 35a and the like) from a state parallel to the y direction, whereby the floating moving device 1 can also be bent and moved in the left-right direction.

(Operation Control in the Second State, Getting on and Off)

When getting on and off is further performed in the state where the floating moving device 1 is stationary on the land, the control unit 15 controls each unit such that the floating moving device 1 comes into the second state (see FIG. 4).

Specifically, the control unit 15 causes the adjustment units (the left front primary adjustment unit 51a1 and the left front secondary adjustment unit 51a2) of the left front connection unit 50a to operate such that the rotation axis 36a of the left front impeller 33a is substantially parallel to the y direction, and the left front wheel 35a is in contact with the ground.

That is, the left front primary adjustment unit 51a1 and the left front secondary adjustment unit 51a2 adjust the positions and directions of the left front impeller 33a and the left front wheel 35a such that the rotation axis 36a of the left front impeller 33a and the left front wheel 35a is substantially parallel to at least the left-right direction.

Further, the control unit 15 causes the adjustment units (the right front primary adjustment unit 51b1, the right front secondary adjustment unit 51b2) of the right front connection unit 50b to operate such that the rotation axis 36b of the right front impeller 33b is substantially parallel to the y direction and the right front wheel 35b is in contact with the ground.

That is, the right front primary adjustment unit 51b1 and the right front secondary adjustment unit 51b2 adjust the positions and directions of the right front impeller 33b and the right front wheel 35b such that the rotation axis 36b of the right front impeller 33b and the right front wheel 35b is substantially parallel to at least the left-right direction.

Further, the control unit 15 causes the adjustment units (the left middle primary adjustment unit 51c1, the left middle secondary adjustment unit 51c2) of the left middle connection unit 50c to operate such that the rotation axis 36c of the left middle impeller 33c is substantially parallel to the z direction.

That is, the left middle primary adjustment unit 51c1 and the left middle secondary adjustment unit 51c2 adjust the positions and directions of the left middle impeller 33c and the left middle wheel 35c such that the rotation axis 36c of the left middle impeller 33c and the left middle wheel 35c is substantially parallel to at least the up-down direction and gas or the like sucked by the left middle impeller 33c is jetted at least in the downward direction.

Further, the control unit 15 causes the adjustment units (the right middle primary adjustment unit 51d1, the right middle secondary adjustment unit 51d2) of the right middle connection unit 50d to operate such that the rotation axis 36d of the right middle impeller 33d is substantially parallel to the z direction.

That is, the right middle primary adjustment unit 51d1 and the right middle secondary adjustment unit 51d2 adjust the positions and directions of the right middle impeller 33d and the right middle wheel 35d such that the rotation axis 36d of the right middle impeller 33d and the right middle wheel 35d is substantially parallel to at least the up-down direction and gas or the like sucked by the right middle impeller 33d is jetted at least in the downward direction.

The operation control in the second state may be performed in only one of the left middle connection unit 50c and the right middle connection unit 50d.

Further, the control unit 15 causes the adjustment units (the Left rear primary adjustment unit 51e1, the left rear secondary adjustment unit 51e2) of the left rear connection unit 50e to operate such that the rotation axis 36e of the left rear impeller 33e is substantially parallel to the y direction and the left rear wheel 35e is in contact with the ground.

That is, the left rear primary adjustment unit 51e1 and the left rear secondary adjustment unit 51e2 adjust the positions and directions of the left rear impeller 33e and the left rear wheel 35e such that the rotation axis 36e of the left rear impeller 33e and the left rear wheel 35e is substantially parallel to at least the left-right direction.

Further, the control unit 15 causes the adjustment units (the right rear primary adjustment unit 51f1, the right rear secondary adjustment unit 51f2) of the right rear connection unit 50f to operate such that the rotation axis 36f of the right rear impeller 33f is substantially parallel to the y direction and the right rear wheel 35f is in contact with the ground.

That is, the right rear primary adjustment unit 51f1 and the right rear secondary adjustment unit 51f2 adjust the positions and directions of the right rear impeller 33f and the right rear wheel 35f such that the rotation axis 36f of the right rear impeller 33f and the right rear wheel 35f is substantially parallel to at least the left-right direction.

Further, the control unit 15 causes the adjustment unit (the front center adjustment portion 61a) of the front center connection unit 60a to operate such that the rotation axis 46a of the front center impeller 43a is substantially parallel to the y direction and the front center wheel 45a is in contact with the ground.

That is, the front center adjustment unit 61a adjusts the directions of the front center impeller 43a and the front center wheel 45a such that the rotation axis 46a of the front center impeller 43a and the front center wheel 45a is substantially parallel to at least the left-right direction.

Further, the control unit 15 causes the adjusting unit (the rear center adjustment unit 61b) of the rear center connection unit 60b to operate such that the rotation axis 46b of the rear center impeller 43b is substantially parallel to the y direction and the rear center wheel 45b is in contact with the ground.

That is, the rear center adjustment unit 61b adjusts the directions of the rear center impeller 43b and the rear center wheel 45b such that the rotation axis 46b of the rear center impeller 43b and the rear center wheel 45b is substantially parallel to at least the left-right direction.

In order to prevent the floating moving device 1 from erroneously moving in the x direction or the like at the time of getting on and off, the control unit 15 may adjust the direction of the front center wheel 45a or the like such that at least one of the rotation axis 46a of the front center impeller 43a and the rotation axis 46b of the rear center impeller 43b is substantially parallel to the front-rear direction.

The lower ends of the rotation units (the left front rotation unit 30a, the right front rotation unit 30b, the left rear rotation unit 30e, the right rear rotation unit 30f, the front center rotation unit 40a, the rear center rotation unit 40b) are located below the lower ends of the tanks 90.

The left middle rotation unit 30c and the right middle rotation unit 30d are separated from the driving unit 10 to enable entry and exit between the outside of the floating moving device 1 and the boarding space of the driving unit 10 via the platform 21.

(Operation Control in the Second State, Takeoff, Etc.)

When the floating moving device 1 takes off, lands, and hovers, the control unit 15 further rotates the left middle motor 31c and causes the left middle transmission unit 37c to operate such that the rotational force of the left middle motor 31c is transmitted to the left middle impeller 33c.

Further, the control unit 15 rotates the right middle motor 31d and causes the right middle transmission unit 37d to operate such that the rotational force of the right middle motor 31d is transmitted to the right middle impeller 33d.

Further, the control unit 15 stops the other motors (the left front motor 31a, the right front motor 31b, the left rear motor 31e, the right rear motor 31f, the front center motor 41a, the rear center motor 41b).

The floating moving device 1 takes off, lands, or hovers according to the rotation of the impellers (the left middle impeller 33c, the right middle impeller 33d).

(Operation Control in the Third State, Air Movement in the First Flight Mode)

When the floating moving device 1 performs the air movement in the first flight mode, the control unit 15 controls each unit such that the floating moving device 1 comes into the third state (see FIG. 5).

Specifically, the control unit 15 causes the adjustment units (the left front primary adjustment unit 51a1, the left front secondary adjustment unit 51a2) of the left front connection unit 50a to operate such that the rotation axis 36a of the left front impeller 33a is substantially parallel to the z direction.

That is, the left front primary adjustment unit 51a1 and the left front secondary adjustment unit 51a2 adjust the positions and directions of the left front impeller 33a and the left front wheel 35a such that the rotation axis 36a of the left front impeller 33a and the left front wheel 35a is substantially parallel to at least the up-down direction and gas or the like sucked by the left front impeller 33a is jetted at least in the downward direction.

Further, the control unit 15 causes the adjustment units (the right front primary adjustment unit 51b1, the right front secondary adjustment unit 51b2) of the right front connection unit 50b to operate such that the rotation axis 36b of the right front impeller 33b is substantially parallel to the z direction.

That is, the right front primary adjustment unit 51b1 and the right front secondary adjustment unit 51b2 adjust the positions and directions of the right front impeller 33b and the right front wheel 35b such that the rotation axis 36b of the right front impeller 33b and the right front wheel 35b is substantially parallel to at least the up-down direction and gas or the like sucked by the right front impeller 33b is jetted at least in the downward direction.

Further, the control unit 15 causes the adjustment units (the left middle primary adjustment unit 51c1, the left middle secondary adjustment unit 51c2) of the left middle connection unit 50c to operate such that the rotation axis 36c of the left middle impeller 33c is substantially parallel to the z direction.

That is, the left middle primary adjustment unit 51c1 and the left middle secondary adjustment unit 51c2 adjust the positions and directions of the left middle impeller 33c and the left middle wheel 35c such that the rotation axis 36c of the left middle impeller 33c and the left middle wheel 35c is substantially parallel to at least the up-down direction and gas or the like sucked by the left middle impeller 33c is jetted at least in the downward direction.

Further, the control unit 15 causes the adjustment units (the right middle primary adjustment unit 51d1, the right middle secondary adjustment unit 51d2) of the right middle connection unit 50d to operate such that the rotation axis 36d of the right middle impeller 33d is substantially parallel to the z direction.

That is, the right middle primary adjustment unit 51d1 and the right middle secondary adjustment unit 51d2 adjust the positions and directions of the right middle impeller 33d and the right middle wheel 35d such that the rotation axis 36d of the right middle impeller 33d and the right middle wheel 35d is substantially parallel to at least the up-down direction and gas or the like sucked by the right middle impeller 33d is jetted at least in the downward direction.

Further, the control unit 15 causes the adjustment units (the left rear primary adjustment unit 51e1, the left rear secondary adjustment unit 51e2) of the left rear connection unit 50e to operate such that the rotation axis 36e of the left rear impeller 33e is substantially parallel to the z direction.

That is, the left rear primary adjustment unit 51e1 and the left rear secondary adjustment unit 51e2 adjust the positions and directions of the left rear impeller 33e and the left rear wheel 35e such that the rotation axis 36e of the left rear impeller 33e and the left rear wheel 35e is substantially parallel to at least the up-down direction and gas or the like sucked by the left rear impeller 33e is jetted at least in the downward direction.

Further, the control unit 15 causes the adjustment units (the right rear primary adjustment unit 51f1, the right rear secondary adjustment unit 51f2) of the right rear connection unit 50f to operate such that the rotation axis 36f of the right rear impeller 33f is substantially parallel to the z direction.

That is, the right rear primary adjustment unit 51f1 and the right rear secondary adjustment unit 51f2 adjust the positions and directions of the right rear impeller 33f and the right rear wheel 35f such that the rotation axis 36f of the right rear impeller 33f and the right rear wheel 35f is substantially parallel to at least the up-down direction and gas or the like sucked by the right rear impeller 33f is jetted at least in the downward direction.

Further, the control unit 15 causes the adjustment unit (the front center adjustment unit 61a) of the front center connection unit 60a to operate such that the rotation axis 46a of the front center impeller 43a is substantially parallel to the x direction.

That is, the front center adjustment unit 61a adjusts the directions of the front center impeller 43a and the front center wheel 45a such that the rotation axis 46a of the front center impeller 43a and the front center wheel 45a is substantially parallel to at least the front-rear direction and gas or the like sucked by the front center impeller 43a is jetted at least in the rear direction.

Further, the control unit 15 causes the adjustment unit (the rear center adjustment unit 61b) of the rear center connection unit 60b to operate such that the rotation axis 46b of the rear center impeller 43b is substantially parallel to the x direction.

That is, the rear center adjustment unit 61b adjusts the directions of the rear center impeller 43b and the rear center wheel 45b such that the rotation axis 46b of the rear center impeller 43b and the rear center wheel 45b is substantially parallel to at least the front-rear direction and gas or the like sucked by the rear center impeller 43b is jetted at least in the rear direction.

The rotation units (the left front rotation unit 30a, the right front rotation unit 30b, the left middle rotation unit 30c, the right middle rotation unit 30d, the left rear rotation unit 30e, the right rear rotation unit 30f) are separated from the driving unit 10.

Further, the control unit 15 rotates the left front motor 31a and causes the left front transmission unit 37a to operate such that the rotational force of the left front motor 31a is transmitted to the left front impeller 33a.

Further, the control unit 15 rotates the right front motor 31b and causes the right front transmission unit 37b to operate such that the rotational force of the right front motor 31b is transmitted to the right front impeller 33b.

Further, the control unit 15 rotates the left middle motor 31c and causes the left middle transmission unit 37c to operate such that the rotational force of the left middle motor 31c is transmitted to the left middle impeller 33c.

Further, the control unit 15 rotates the right middle motor 31d and causes the right middle transmission unit 37d to operate such that the rotational force of the right middle motor 31d is transmitted to the right middle impeller 33d.

Further, the control unit 15 rotates the left rear motor 31e and causes the left rear transmission unit 37e to operate such that the rotational force of the left rear motor 31e is transmitted to the left rear impeller 33e.

Further, the control unit 15 rotates the right rear motor 31f and causes the right rear transmission unit 37f to operate such that the rotational force of the right rear motor 31f is transmitted to the right rear impeller 33f.

Further, the control unit 15 rotates the front center motor 41a.

Further, the control unit 15 rotates the rear center motor 41b.

The floating moving device 1 moves or hovers in the air according to the rotation of the impellers (the left front impeller 33a and the like).

(Rotation Direction Control for the Front Center Impeller 43a and the Rear Center Impeller 43b)

Note that, in the third state, a fourth state which will be described later, and a fifth state which will be described later, it is desirable that adjustment of the directions and operation control for the front center impeller 43a and the rear center impeller 43b should be performed such that a rotating direction of the front center impeller 43a is opposite to a rotating direction of the rear center impeller 43b.

That is, in a positional relation in which the rotation axis 46a of the front center impeller 43a and the rotation axis 46b of the rear center impeller 43b overlap, when operation for jetting gas or the like in the rear direction sucked by the front center impeller 43a and the rear center impeller 43b is performed, the front center impeller 43a and the rear center impeller 43b are subjected to operation control to rotate in opposite directions to each other.

In this case, the front center impeller 43a and the rear center impeller 43b can configure a double reversal fan.

(Water Movement in the Third State)

Note that, when the floating moving device 1 performs the water movement, the control unit 15 may control each unit such that the floating moving device 1 comes into the third state.

When the floating moving device 1 moves on water, the left front motor 31a and the like are controlled such that the rotation speed of the left front impeller 33a, the right front impeller 33b, the left middle impeller 33c, the right middle impeller 33d, the left rear impeller 33e, and the right rear impeller 33f is lower compared with when the floating moving device 1 moves in the air.

(Operation Control in the Fourth State, Air Movement in the Second Flight Mode)

When the floating moving device 1 performs the air movement in the second flight mode, the control unit 15 may control each unit such that the floating moving device 1 comes into the fourth state (see FIGS. 6, 7, and 8).

Specifically, the control unit 15 causes the adjustment units (the left front primary adjustment unit 51a1, the left front secondary adjustment unit 51a2) of the left front connection unit 50a such that the rotation axis 36a of the left front impeller 33a is substantially parallel to the x direction.

That is, the left front primary adjustment unit 51a1 and the left front secondary adjustment unit 51a2 adjust the positions and directions of the left front impeller 33a and the left front wheel 35a such that the rotation axis 36a of the left front impeller 33*a* and the left front wheel 35*a* is substantially parallel to at least the front-rear direction and gas or the like sucked by the left front impeller 33*a* is jetted at least in the rear direction.

Further, the control unit 15 causes the adjustment units (the right front primary adjustment unit 51*b*1, the right front secondary adjustment unit 51*b*2) of the right front connection unit 50*b* to operate such that the rotation axis 36*b* of the right front impeller 33*b* is substantially parallel to the x direction.

That is, the right front primary adjustment unit 51*b*1 and the right front secondary adjustment unit 51*b*2 adjust the positions and directions of the right front impeller 33*b* and the right front wheel 35*b* such that the rotation axis 36*b* of the right front impeller 33*b* and the right front wheel 35*b* is substantially parallel to at least the front-rear direction and gas or the like sucked by the right front impeller 33*b* is jetted at least in the rear direction.

Further, the control unit 15 causes the adjustment units (the left middle primary adjustment unit 51*c*1, the left middle secondary adjustment unit 51*c*2) of the left middle connection unit 50*c* to operate such that the rotation axis 36*c* of the left middle impeller 33*c* is substantially parallel to the x direction and does not overlap the left front impeller 33*a* when viewed from the x direction.

That is, the left middle primary adjustment unit 51*c*1 and the left middle secondary adjustment unit 51*c*2 adjust the positions and directions of the left middle impeller 33*c* and the left middle wheel 35*c* such that the rotation axis 36*c* of the left middle impeller 33*c* and the left middle wheel 35*c* is substantially parallel to at least the front-rear direction, gas or the like sucked by the left middle impeller 33*c* is jetted at least in the rear direction, and the rotation axis 36*c* of the left middle impeller 33*c* does not overlap the rotation axis 36*a* of the left front impeller 33*a*.

Further, the control unit 15 causes the adjustment units (the right middle primary adjustment unit 51*d*1, the right middle secondary adjustment unit 51*d*2) of the right middle connection unit 50*d* to operate such that the rotation axis 36*d* of the right middle impeller 33*d* is substantially parallel to the x direction and does not overlap the right front impeller 33*b* when viewed from the x direction.

That is, the right middle primary adjustment unit 51*d*1 and the right middle secondary adjustment unit 51*d*2 adjust the positions and direction of the right middle impeller 33*d* and the right middle wheel 35*d* such that the rotation axis 36*d* of the right middle impeller 33*d* and the right middle wheel 35*d* is substantially parallel to at least the front-rear direction, gas or the like sucked by the right middle impeller 33*d* is jetted at least in the rear direction, and the rotation axis 36*d* of the right middle impeller 33*d* does not overlap the rotation axis 36*b* of the right front impeller 33*b*.

Further, the control unit 15 causes the adjustment units (the left rear primary adjustment unit 51*e*1, the left rear secondary adjustment unit 51*e*2) of the left rear connection unit 50*e* to operate such that the rotation axis 36*e* of the left rear impeller 33*e* is substantially parallel to the x direction and does not overlap the left front impeller 33*a* and the left middle impeller 33*c* when viewed from the x direction.

That is, the left rear primary adjustment unit 51*e*1 and the left rear secondary adjustment unit 51*e*2 adjust the positions and directions of the left rear impeller 33*e* and the left rear wheel 35*e* such that the rotation axis 36*e* of the left rear impeller 33*e* and the left rear wheel 35*e* is substantially parallel to at least the front-rear direction, gas or the like sucked by the left rear impeller 33*e* is jetted at least in the rear direction, and the rotation axis 36*e* of the left rear impeller 33*e* does not overlap the rotation axis 36*a* of the left front impeller 33*a* and the rotation axis 36*c* of the left middle impeller 33*c*.

Further, the control unit 15 causes the adjustment units (the right rear primary adjustment unit 51*f*1, the right rear secondary adjustment unit 51*f*2) of the right rear connection unit 50*f* to operate such that the rotation axis 36*f* of the right rear impeller 33*f* is substantially parallel to the x direction and does not overlap the right front impeller 33*b* and the right middle impeller 33*d* when viewed from the x direction.

That is, the right rear primary adjustment unit 51*f*1 and the right rear secondary adjustment unit 51*f*2 adjust the positions and directions of the left rear impeller 33*f* and the right rear wheel 35*f* such that the rotation axis 36*f* of the right rear impeller 33*f* and the right rear wheel 35*f* is substantially parallel to at least the front-rear direction, gas or the like sucked by the right rear impeller 33*f* is jetted at least in the rear direction, and the rotation axis 36*f* of the right rear impeller 33*f* does not overlap the rotation axis 36*b* of the right front impeller 33*b* and the rotation axis 36*d* of the right middle impeller 33*d*.

Further, the control unit 15 causes the adjustment unit (the front center adjustment unit 61*a*) of the front center connection unit 60*a* to operate such that the rotation axis 46*a* of the front center impeller 43*a* is substantially parallel to the x direction.

That is, the front center adjustment unit 61*a* adjusts the directions of the front center impeller 43*a* and the front center wheel 45*a* such that the rotation axis 46*a* of the front center impeller 43*a* and the front center wheel 45*a* is substantially parallel to at least the front-rear direction and gas or the like sucked by the front center impeller 43*a* is jetted at least in the rear direction.

Further, the control unit 15 causes the adjustment unit (the rear center adjustment unit 61*b*) of the rear center connection unit 60*b* to operate such that the rotation axis 46*b* of the rear center impeller 43*b* is substantially parallel to the x direction.

That is, the rear center adjustment unit 61*b* adjusts the directions of the rear center impeller 43*b* and the rear center wheel 45*b* such that the rotation axis 46*b* of the rear center impeller 43*b* and the rear center wheel 45*b* is substantially parallel to at least the front-rear direction and gas or the like sucked by the rear center impeller 43*b* is jetted at least in the rear direction.

Further, the control unit 15 rotates the left front motor 31*a* and causes the left front transmission unit 37*a* to operate such that the rotational force of the left front motor 31*a* is transmitted to the left front impeller 33*a*.

Further, the control unit 15 rotates the right front motor 31*b* and causes the right front transmission unit 37*b* to operate such that the rotational force of the right front motor 31*b* is transmitted to the right front impeller 33*b*.

Further, the control unit 15 rotates the left middle motor 31*c* and causes the left middle transmission unit 37*c* to operate such that the rotational force of the left middle motor 31*c* is transmitted to the left middle impeller 33*c*.

Further, the control unit 15 also rotates the right middle motor 31*d* and causes the right middle transmission unit 37*d* to operate such that the rotational force of the right middle motor 31*d* is transmitted to the right middle impeller 33*d*.

Further, the control unit 15 rotates the left rear motor 31*e* and causes the left rear transmission unit 37*e* to operate such that the rotational force of the left rear motor 31*e* is transmitted to the left rear impeller 33*e*.

Further, the control unit 15 rotates the right rear motor 31*f* and causes the right rear transmission unit 37*f* to operate such that the rotational force of the right rear motor 31*f* is transmitted to the right rear impeller 33*f*.

Further, the control unit 15 rotates the front center motor 41*a*.

Further, the control unit 15 rotates the rear center motor 41*b*.

The floating moving device 1 moves in the air according to the rotation of the impellers (the left front impeller 33*a* and the like).

(Operation Control in the Fifth State, Water Movement)

When the floating moving device 1 performs the water movement, the control unit 15 controls each unit such that the floating moving device 1 comes into the fifth state (See FIGS. 9 and 10).

Specifically, the control unit 15 causes the adjustment units (the left front primary adjustment unit 51*a*1, the left front secondary adjustment unit 51*a*2) of the left front connection unit 50*a* to operate such that the rotation axis 36*a* of the left front impeller 33*a* is substantially parallel to the y direction.

That is, the left front primary adjustment unit 51*a*1 and the left front secondary adjustment unit 51*a*2 adjust the positions and directions of the left front impeller 33*a* and the left front wheel 35*a* such that the rotation axis 36*a* of the left front impeller 33*a* and the left front wheel 35*a* is substantially parallel to at least the left-right direction.

Further, the control unit 15 causes the adjustment units (the right front primary adjustment unit 51*b*1, the right front secondary adjustment unit 51*b*2) of the right front connection unit 50*b* to operate such that the rotation axis 36*b* of the right front impeller 33*b* is substantially parallel to the y direction.

That is, the right front primary adjustment unit 51*b*1 and the right front secondary adjustment unit 51*b*2 adjust the positions and directions of the right front impeller 33*b* and the right front wheel 35*b* such that the rotation axis 36*b* of the right front impeller 33*b* and the right front wheel 35*b* is substantially parallel to at least the left-right direction.

Further, the control unit 15 causes the adjustment units (the left middle primary adjustment unit 51*c*1, the left middle secondary adjustment unit 51*c*2) of the left middle connection unit 50*c* to operate such that the rotation axis 36*c* of the left middle impeller 33*c* is substantially parallel to the y direction.

That is, the left middle primary adjustment unit 51*c*1 and the left middle secondary adjustment unit 51*c*2 adjust the positions and direction of the left middle impeller 33*c* and the left middle wheel 35*c* such that the rotation axis 36*c* of the left middle impeller 33*c* and the left middle wheel 35*c* is substantially parallel to at least the left-right direction.

Further, the control unit 15 causes the adjustment units (the right middle primary adjustment unit 51*d*1, the right middle secondary adjustment unit 51*d*2) of the right middle connection unit 50*d* to operate such that the rotation axis 36*d* of the right middle impeller 33*d* is substantially parallel to the y direction.

That is, the right middle primary adjustment unit 51*d*1 and the right middle secondary adjustment unit 51*d*2 adjust the positions and directions of the right middle impeller 33*d* and the right middle wheel 35*d* such that the rotation axis 36*d* of the right middle impeller 33*d* and the right middle wheel 35*d* is substantially parallel to at least the left-right direction.

Further, the control unit 15 causes the adjustment units (the left rear primary adjustment unit 51*e*1, the left rear secondary adjustment unit 51*e*2) of the left rear connection unit 50*e* to operate such that the rotation axis 36*e* of the left rear impeller 33*e* is substantially parallel to the y direction.

That is, the left rear primary adjustment unit 51*e*1 and the left rear secondary adjustment unit 51*e*2 adjust the positions and directions of the left rear impeller 33*e* and the left rear wheel 35*e* such that the rotation axis 36*e* of the left rear impeller 33*e* and the left rear wheel 35*e* is substantially parallel to at least the left-right direction.

Further, the control unit 15 causes the adjustment units (the right rear primary adjustment unit 51*f*1, the right rear secondary adjustment unit 51*f*2) of the right rear connection unit 50*f* to operate such that the rotation axis 36*f* of the right rear impeller 33*f* is substantially parallel to the y direction.

That is, the right rear primary adjustment unit 51*f*1 and the right rear secondary adjustment unit 51*f*2 adjust the positions and directions of the right rear impeller 33*f* and the right rear wheel 35*f* such that the rotation axis 36*f* of the right rear impeller 33*f* and the right rear wheel 35*f* is substantially parallel to at least the left-right direction.

Further, the control unit 15 causes the adjustment unit (the front center adjustment unit 61*a*) of the front center connection unit 60*a* to operate such that the rotation axis 46*a* of the front center impeller 43*a* is substantially parallel to the x direction.

That is, the front center adjustment unit 61*a* adjusts the directions of the front center impeller 43*a* and the front center wheel 45*a* such that the rotation axis 46*a* of the front center impeller 43*a* and the front center wheel 45*a* is substantially parallel to at least the front-rear direction and liquid sucked by the front center impeller 43*a* is jetted at least in the rear direction.

Further, the control unit 15 causes the adjustment unit (the rear center adjustment unit 61*b*) of the rear center connection unit 60*b* to operate such that the rotation axis 46*b* of the rear center impeller 43*b* is substantially parallel to the x direction.

That is, the rear center adjustment unit 61*b* adjusts the directions of the rear center impeller 43*b* and the rear center wheel 45*b* such that the rotation axis 46*b* of the rear center impeller 43*b* and the rear center wheel 45*b* is substantially parallel to at least the front-rear direction and liquid sucked by the rear center impeller 43*b* is jetted at least in the rear direction.

Further, the control unit 15 stops the left front motor 31*a*, the right front motor 31*b*, the left middle motor 31*c*, the right middle motor 31*d*, the left rear motor 31*e*, and the right rear motor 31*f*.

Further, the control unit 15 rotates the front center motor 41*a*.

Further, the control unit 15 rotates the rear center motor 41*b*.

The impellers (the front center impeller 43*a* and the rear center impeller 43*b*) function as screws. According to the rotation of these impellers, the floating moving device 1 moves on water.

(Correspondence Relation with Words and Phrases in Claims)

The "first rotation unit" described in the claims corresponds to the left front rotation unit 30*a* and/or the left rear rotation unit 30*e* in the first embodiment, the "second rotation unit" described in the claims corresponds to the right front rotation unit 30*b* and/or the right rear rotation unit 30*f* in the first embodiment, the "fourth rotation unit" described in the claims corresponds to the left middle rotation unit 30*c* in the first embodiment, and the "fifth rotation unit" described in the claims corresponds to the right middle rotation unit 30*d* in the first embodiment.

When the "first rotation unit" corresponds to the left front rotation unit 30*a* and the "second rotation unit" corresponds to the right front rotation unit 30b, the "third rotation unit" described in the claims corresponds to the rear center rotation unit 40b.

When the "first rotation unit" corresponds to the left rear rotation unit 30e and the "second rotation unit" corresponds to the right rear rotation unit 30f, the "third rotation unit" described in the claims corresponds to the front center rotation unit 40a.

When the "first rotation unit" corresponds to the left front rotation unit 30a and the left rear rotation unit 30e and the "second rotation unit" corresponds to the right front rotation unit 30b and the right rear rotation unit 30f, the "third rotation unit" described in the claims corresponds to the front center rotation unit 40a and/or the rear center rotation unit 40b.

(Effect of Providing at Least Five Rotation Units)

By performing operation control for at least five rotation units, it becomes possible to realize the floating moving device 1 capable of performing land movement, air movement, and water movement, that is, to move in a state of floating in the air and on the water away from the ground.

(Effect of Providing the Hydrogen Tanks 90)

Hydrogen filled in the hydrogen tanks 90 is converted into electricity and the left front rotation unit 30a and the like are driven using the converted electricity. Since a large amount of hydrogen is filled in the hydrogen tanks 90 at the time of takeoff, the specific gravity of the floating moving device 1 decreases to make it easy for the floating moving device 1 to take off.

The hydrogen tanks 90 can be also used as floats at the time of the water movement.

(Effects of Performing the Air Movement or the Like in the First Flight Mode (the Third State))

The left front impeller 33a, the right front impeller 33b, the left middle impeller 33c, the right middle impeller 33d, the left rear impeller 33e, and the right rear impeller 33f are driven to jet sucked gas or the like in the downward direction to enable the air movement including hovering.

Further, the front center impeller 43a and the rear center impeller 43b function as screws. According to the rotation of these, the floating moving device 1 moves on water.

In addition, since the impellers (the left front impeller 33a, the right front impeller 33b, the left middle impeller 33c, the right middle impeller 33d, the left rear impeller 33e, the right rear impeller 33f) blow air to a water surface, the floating moving device 1 floats on a shallow position of the water surface and can move on the water with less resistance of the water compared with a form in which the blowing is not performed.

(Effects of Performing the Air Movement in the Second Flight Mode (the Fourth State))

The left front impeller 33a, the right front impeller 33b, the left middle impeller 33c, the right middle impeller 33d, the left rear impeller 33e, and the right rear impeller 33f are driven to jet sucked gas or the like in the rear direction in a state in which rotation axes (the impellers) do not overlap in the front-rear direction, whereby it becomes possible to perform the air movement faster than that in the third state.

(Effects of Using the Transmission Unit)

The rotational force of the motor is transmitted to the impeller or the wheel via the transmission unit.

Accordingly, when the impeller is rotated, rotation of the wheel can be stopped and, when the wheel is rotated, the rotation of the impeller can be stopped. It becomes possible to perform operation control for the impeller and the wheel with a small load.

Second Embodiment

In the first embodiment, an example is explained in which the front center impeller 43a of the front center rotation unit 40a and the rear center impeller 43b of the rear center rotation unit 40b are used for the water movement.

In the second embodiment, the left rear impeller 33e of the left rear rotation unit 30e and the right rear impeller 33f of the right rear rotation unit 30f are used for the water movement. (See FIGS. 11 to 19).

Differences from the first embodiment are mainly explained below.

(Omission of the Front Center Rotation Unit 40a and the Like)

In the second embodiment, the front center rotation unit 40a, the rear center rotation unit 40b, the front center connection unit 60a, and the rear center connection unit 60b are omitted.

(Left Rear Connection Unit 50e)

The left rear connection unit 50e in the second embodiment includes the adjustment units (the left rear primary adjustment unit 51e1, the left rear secondary adjustment unit 51e2, a left rear tertiary adjustment unit 51e3) and a power generation unit (the left rear power generation unit 53e).

The housing of the left rear connection unit 50e has a substantially L shape when viewed from the x direction in the first state.

One side of said substantially L shape has a surface perpendicular to the z direction and faces a part of the upper surface of the driving unit 10, in the first state.

The other side of said substantially L shape has a surface perpendicular to the y direction and faces a part of the side surface of the driving unit 10, in the first state.

However, in the fifth state, the housing of the left rear connection unit 50e has a substantially L shape when viewed from the y direction.

At this time, one side of said substantially L shape has a surface perpendicular to the z direction and faces a part of the upper surface of the driving unit 10.

The other side of said substantially L shape has a surface perpendicular to the x direction and faces a part of the back surface of the driving unit 10.

An end portion of the one side of said substantially L shape is attached to the upper surface of the driving unit 10 via the left rear primary adjustment unit 51e1 and the left rear tertiary adjustment unit 51e3.

An end portion of the other side of said substantially L shape is attached to the left rear rotation unit 30e via the left rear secondary adjustment unit 51e2.

The left rear primary adjustment unit 51e1 holds the left rear rotation unit 30e and a portion other than the left rear primary adjustment unit 51e1 and the left rear tertiary adjustment unit 51e3 of the left rear connection unit 50e in a movable state with respect to the driving unit 10.

Specifically, the left rear primary adjustment unit 51e1 holds the left rear rotation unit 30e and the portion other than the left rear primary adjustment unit 51e1 and the left rear tertiary adjustment unit 51e3 of the left rear connection unit 50e in a state in which the left rear rotation unit 30e and the portion other than the left rear primary adjustment unit 51e1 and the left rear tertiary adjustment unit 51e3 of the left rear connection unit 50e are rotatable around a first axis parallel to the x direction in the first state and the distance (the first distance d1) between the first axis and the left rear rotation unit 30e and the portion other than the left rear primary adjustment unit 51e1 and the left rear tertiary adjustment unit 51e3 of the left rear connection unit 50e is variable.

The left rear secondary adjustment unit 51e2 holds the left rear rotation unit 30e in a state in which the left rear rotation unit 30e is rotatable around a second axis variable from a state parallel to the z direction to a state parallel to the horizontal direction and the distance (the second distance d2) between the left rear rotation unit 30e and the portion other than the left rear secondary adjustment unit 51e2 of the left rear connection unit 50e is variable.

In the first state, the dimensions of each unit are set such that the lower end of the left rear rotation unit 30e is located below the lower ends of the tanks 90 and is in contact with the ground in a state in which the left rear secondary adjustment unit 51e2 contracts.

The left rear tertiary adjusting part 51e3 holds the left rear rotation unit 30e and a portion other than the left rear tertiary adjustment unit 51e3 of the left rear connection unit 50e in a state in which the left rear rotation unit 30e and the portion other than the left rear tertiary adjustment unit 51e3 of the left rear connection unit 50e are rotatable round a third axis parallel to the z direction with respect to the driving unit 10.

For example, in the first state (see FIG. 12), the rotation axis (the first axis) of the left rear primary adjustment unit 51e1 becomes parallel to the x direction, the rotation axis (the second axis) of the left rear secondary adjustment unit 51e2 becomes parallel to the z direction, and the left rear connection unit 51e holds the left rear rotation unit 30e such that the rotation axis 36e of the left rear impeller 33e and the left rear wheel 35e is substantially parallel to the y direction.

Further, in the third state (see FIGS. 14 and 15), the rotation axis (the first axis) of the left rear primary adjustment unit 51e1 becomes parallel to the x direction, the rotation axis (the second axis) of the left rear secondary adjustment unit 51e2 becomes parallel to the y direction, and the left rear connection unit 51e holds the left rear rotation unit 30e such that the rotation axis 36e of the left rear impeller 33e and the left rear wheel 35e is substantially parallel to the z direction.

Further, in the fifth state (see FIGS. 16 and 17), the rotation axis (the first axis) of the left rear primary adjustment unit 51e1 becomes parallel to the y direction, the rotation axis (the second axis) of the left rear secondary adjustment unit 51e2 becomes parallel to the z direction, and the left rear connection unit 51e holds the left rear rotation unit 30e such that the rotation axis 36e of the left rear impeller 33e and the left rear wheel 35e is substantially parallel to the x direction.

Therefore, the left rear rotation unit 30e is held by the left rear primary adjustment unit 51e1, the left rear secondary adjustment unit 51e2, and the left rear tertiary adjustment unit 53e3 in a state in which the rotation axis 36e of the left rear impeller 33e and the like can face various directions.

(Right Rear Connection Unit 50f)

Like the left rear connection unit 50e, the right rear connection unit 50f includes adjustment units (the right rear primary adjustment unit 51f1, the right rear secondary adjustment unit 51f2, a right rear tertiary adjustment unit 51f3) and a power generation unit (the right rear power generation unit 53f).

(Operation Control in the First State, Land Stationary)

Figure 12:
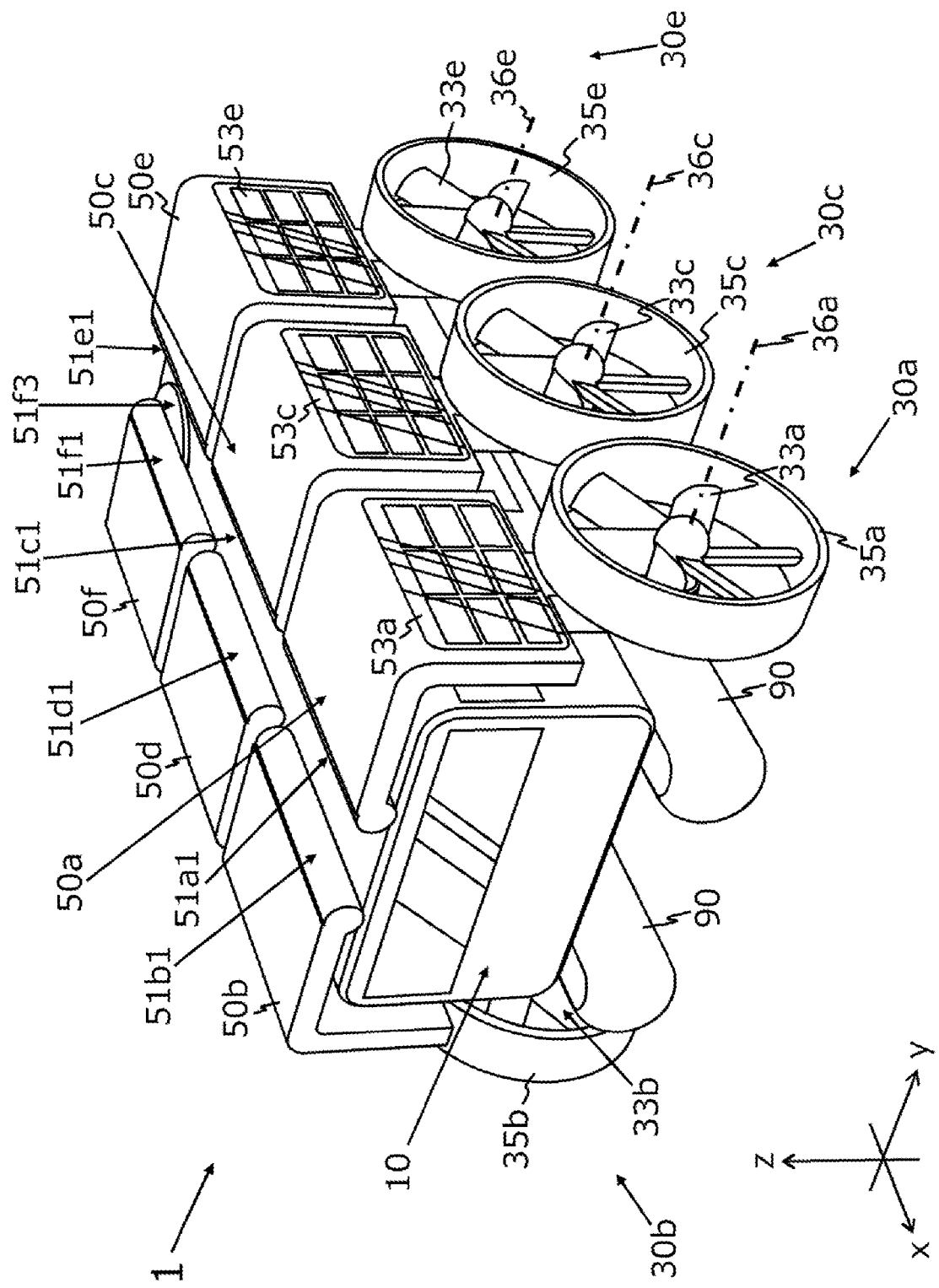
FIG. 12 is a perspective view of the floating moving device in the first state in the second embodiment.

When the floating moving device 1 is stationary on the land, as in the first state in the first embodiment, the control unit 15 controls each unit such that the floating moving device 1 is in the first state (see FIG. 12).

Specifically, the control unit 15 causes the adjustment units (the left front primary adjustment unit 51a1, the left front secondary adjustment unit 51a2) of the left front connection unit 50a to operate such that the rotation axis 36a of the left front impeller 33a is substantially parallel to the y direction, and the left front wheel 35a is in contact with the ground.

That is, the left front primary adjustment unit 51a1 and the left front secondary adjustment unit 51a2 adjust the positions and directions of the left front impeller 33a and the left front wheel 35a such that the rotation axis 36a of the left front impeller 33a and the left front wheel 35a is substantially parallel to at least the left-right direction.

Further, the control unit 15 causes the adjustment units (the right front primary adjustment unit 51b1, the right front secondary adjustment unit 51b2) of the right front connection unit 50b to operate such that the rotation axis 36b of the right front impeller 33b is substantially parallel to the y direction and the right front wheel 35b is in contact with the ground.

That is, the right front primary adjustment unit 51b1 and the right front secondary adjustment unit 51b2 adjust the positions and directions of the right front impeller 33b and the right front wheel 35b such that the rotation axis 36b of the right front impeller 33b and the right front wheel 35b is substantially parallel to at least the left-right direction.

Further, the control unit 15 causes the adjustment units (the left middle primary adjustment unit 51c1, the left middle secondary adjustment unit 51c2) of the left middle connection unit 50c to operate such that the rotation axis 36c of the left middle impeller 33c is substantially parallel to the y direction and the left middle wheel 35c is in contact with the ground.

That is, the left middle primary adjustment unit 51c1 and the left middle secondary adjustment unit 51c2 adjust the positions and direction of the left middle impeller 33c and the left middle wheel 35c such that the rotation axis 36c of the left middle impeller 33c and the left middle wheel 35c is substantially parallel to at least the left-right direction.

Further, the control unit 15 causes the adjustment units (the right middle primary adjustment unit 51d1, the right middle secondary adjustment unit 51d2) of the right middle connection unit 50d to operate such that the rotation axis 36d of the right middle impeller 33d is substantially parallel to the y direction and the right middle wheel 35d is in contact with the ground.

That is, the right middle primary adjustment unit 51d1 and the right middle secondary adjustment unit 51d2 adjust the positions and directions of the right middle impeller 33d and the right middle wheel 35d such that the rotation axis 36d of the right middle impeller 33d and the right middle wheel 35d is substantially parallel to at least the left-right direction.

Further, the control unit 15 causes the adjustment units (the left rear primary adjustment unit 51e1, the left rear secondary adjustment unit 51e2, the left rear tertiary adjustment unit 51e3) of the left rear connection unit 50e to operate such that the rotation axis 36e of the left rear impeller 33e is substantially parallel to the y direction and left rear wheel 35e is in contact with the ground.

That is, the left rear primary adjustment unit 51e1, the left rear secondary adjustment unit 51e2, and the left rear tertiary adjustment unit 51e3 adjust the positions and directions of the left rear impeller 33e and the left rear wheel 35e such that the rotation axis 36e of the left rear impeller 33e and the left rear wheel 35e is substantially parallel to at least the left-right direction.

Further, the control unit 15 causes the adjustment units (the right rear primary adjustment unit 51f1, the right rear secondary adjustment unit 51f2, the right rear tertiary adjustment unit 51f3) of the right rear connection unit 50f to operate such that the rotation axis 36f of the right rear impeller 33f is substantially parallel to the y direction and the right rear wheel 35f is in contact with the ground.

That is, the right rear primary adjustment unit 51f1, the right rear secondary adjustment unit 51f2, and the right rear tertiary adjustment unit 51f3 adjust the positions and directions of the right rear impeller 33f and the right rear wheel 35f such that the rotation axis 36f of the right rear impeller 33f and the right rear wheel 35f is substantially parallel to at least the left-right direction.

The lower ends of the rotation units (the left front rotation unit 30a, the right front rotation unit 30b, the left middle rotation unit 30c, the right middle rotation unit 30d, the left rear rotation unit 30e, the right rear rotation unit 30f) are located below the lower ends of the tanks 90.

The platform 21 on the left side becomes in a state in which being covered with the left middle rotation unit 30c and the left middle connection unit 50c.

The platform 21 on the right side becomes in a state in which being covered with the right middle rotation unit 30d and the right middle connection unit 50d.

(Operation Control in the First State, Land Movement)

When the floating moving device 1 moves on the land, the control unit 15 further rotates the left front motor 31a and causes the left front transmission unit 37a to operate such that the rotational force of the left front motor 31a is transmitted to the left front wheel 35a.

Further, the control unit 15 rotates the right front motor 31b and causes the right front transmission unit 37b to operate such that the rotational force of the right front motor 31b is transmitted to the right front wheel 35b.

Further, the control unit 15 rotates the left middle motor 31c and causes the left middle transmission unit 37c to operate such that the rotational force of the left middle motor 31c is transmitted to the left middle wheel 35c.

Further, the control unit 15 rotates the right middle motor 31d and causes the right middle transmission unit 37d to operate such that the rotational force of the right middle motor 31d is transmitted to the right middle wheel 35d.

Further, the control unit 15 rotates the left rear motor 31e and causes the left rear transmission unit 37e to operate such that the rotational force of the left rear motor 31e is transmitted to the left rear wheel 35e.

Further, the control unit 15 rotates the right rear motor 31f and causes the right rear transmission unit 37f to operate such that the rotational force of the right rear motor 31f is transmitted to the right rear wheel 35f.

However, some motors among the left front motor 31a, the right front motor 31b, the left middle motor 31c, the right middle motor 31d, the left rear motor 31e, and the right rear motor 31f may be stopped and only the remaining motors may be driven.

The floating moving device 1 moves on the land according to the rotation of the wheels (the left front wheel 35a and the like).

By adjusting a rotation amount of the wheels (the left front wheel 35a and the like), the floating moving device 1 can be moved not only on a linear track in the front-rear direction but also by being bent in the left-right direction.

Further, the secondary adjustment units (the left front secondary adjustment unit 51a2 and the like) change the rotation axes of the wheels (the left front wheel 35a and the like) from a state parallel to the y direction, whereby the floating moving device 1 can also be bent and moved in the left-right direction.

(Operation Control in the Second State, Getting on and Off)

Figure 13:
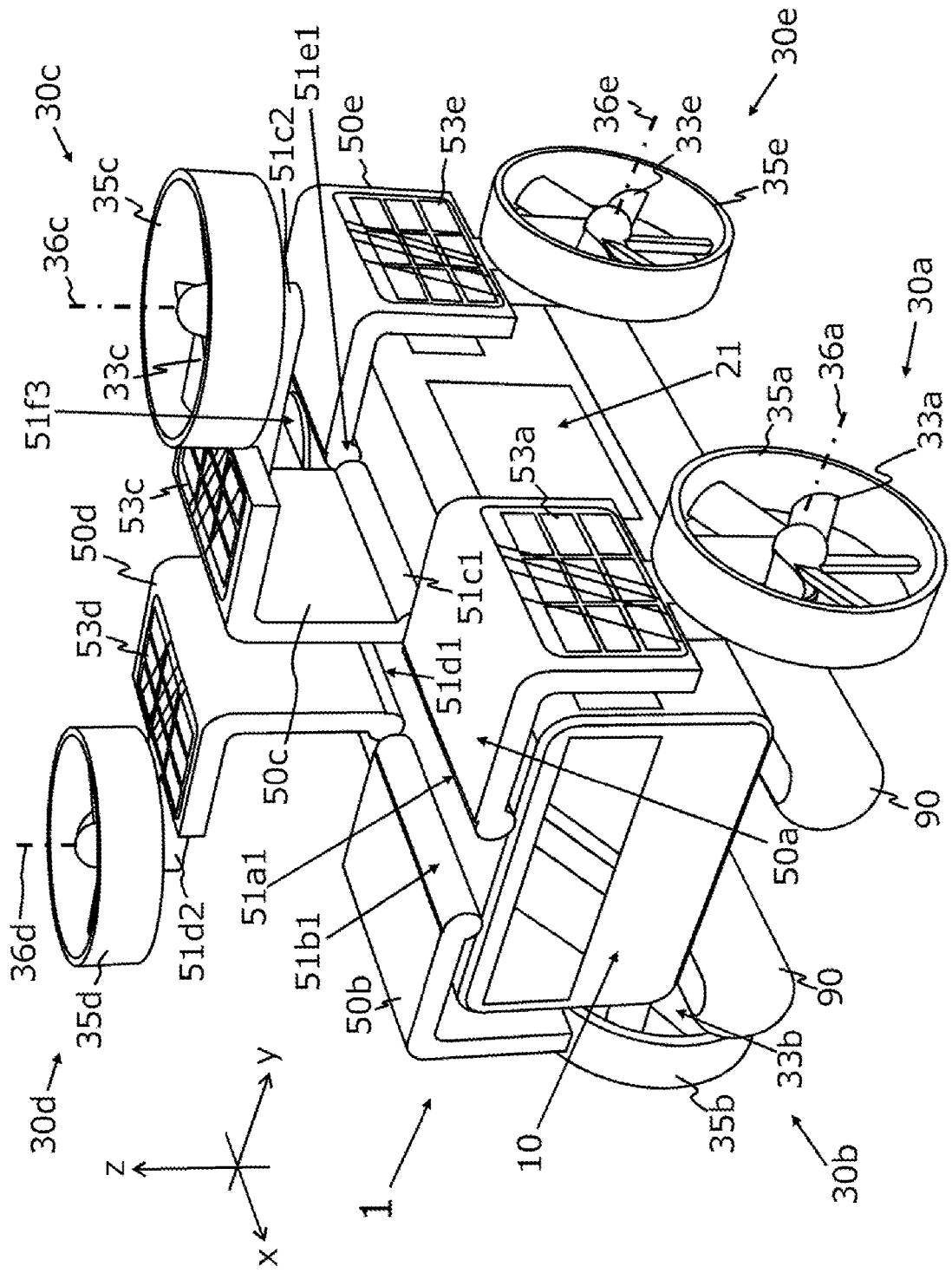
FIG. 13 is a perspective view of the floating moving device in the second state in the second embodiment.

When getting on and off is further performed in the state where the floating moving device 1 is stationary on the land, as in the second state in the first embodiment, the control unit 15 controls each unit such that the floating moving device 1 is in the second state (see FIG. 13).

Specifically, the control unit 15 causes the adjustment units (the left front primary adjustment unit 51a1 and the left front secondary adjustment unit 51a2) of the left front connection unit 50a to operate such that the rotation axis 36a of the left front impeller 33a is substantially parallel to the y direction, and the left front wheel 35a is in contact with the ground.

That is, the left front primary adjustment unit 51a1 and the left front secondary adjustment unit 51a2 adjust the positions and directions of the left front impeller 33a and the left front wheel 35a such that the rotation axis 36a of the left front impeller 33a and the left front wheel 35a is substantially parallel to at least the left-right direction.

Further, the control unit 15 causes the adjustment units (the right front primary adjustment unit 51b1, the right front secondary adjustment unit 51b2) of the right front connection unit 50b to operate such that the rotation axis 36b of the right front impeller 33b is substantially parallel to the y direction and the right front wheel 35b is in contact with the ground.

That is, the right front primary adjustment unit 51b1 and the right front secondary adjustment unit 51b2 adjust the positions and directions of the right front impeller 33b and the right front wheel 35b such that the rotation axis 36b of the right front impeller 33b and the right front wheel 35b is substantially parallel to at least the left-right direction.

Further, the control unit 15 causes the adjustment units (the left middle primary adjustment unit 51c1, the left middle secondary adjustment unit 51c2) of the left middle connection unit 50c to operate such that the rotation axis 36c of the left middle impeller 33c is substantially parallel to the z direction.

That is, the left middle primary adjustment unit 51c1 and the left middle secondary adjustment unit 51c2 adjust the positions and directions of the left middle impeller 33c and the left middle wheel 35c such that the rotation axis 36c of the left middle impeller 33c and the left middle wheel 35c is substantially parallel to at least the up-down direction and gas or the like sucked by the left middle impeller 33c is jetted at least in the downward direction.

Further, the control unit 15 causes the adjustment units (the right middle primary adjustment unit 51d1, the right middle secondary adjustment unit 51d2) of the right middle connection unit 50d to operate such that the rotation axis 36d of the right middle impeller 33d is substantially parallel to the z direction.

That is, the right middle primary adjustment unit 51d1 and the right middle secondary adjustment unit 51d2 adjust the positions and directions of the right middle impeller 33d and the right middle wheel 35d such that the rotation axis 36d of the right middle impeller 33d and the right middle wheel 35d is substantially parallel to at least the up-down direction and gas or the like sucked by the right middle impeller 33d is jetted at least in the downward direction.

The operation control in the second state may be performed in only one of the left middle connection unit 50c and the right middle connection unit 50d.

Further, the control unit 15 causes the adjustment units (the left rear primary adjustment unit 51e1, the left rear secondary adjustment unit 51e2, the left rear tertiary adjustment unit 53e3) of the left rear connection unit 50e to operate such that the rotation axis 36e of the left rear impeller 33e is substantially parallel to the y direction and the left rear wheel 35e is in contact with the ground.

That is, the left rear primary adjustment unit 51e1, the left rear secondary adjustment unit 51e2, and the left rear tertiary adjustment unit 53e3 adjust the positions and directions of the left rear impeller 33e and the left rear wheel 35e such that the rotation axis 36e of the left rear impeller 33e and the left rear wheel 35e is substantially parallel to at least the left-right direction.

Further, the control unit 15 causes the adjustment units (the right rear primary adjustment unit 51f1, the right rear secondary adjustment unit 51f2, the right rear tertiary adjustment unit 53f3) of the right rear connection unit 50f to operate such that the rotation axis 36f of the right rear impeller 33f is substantially parallel to the y direction and the right rear wheel 35f is in contact with the ground.

That is, the right rear primary adjustment unit 51f1, the right rear secondary adjustment unit 51f2, and the right rear tertiary adjustment unit 53f3 adjust the positions and directions of the right rear impeller 33f and the right rear wheel 35f such that the rotation axis 36f of the right rear impeller 33f and the right rear wheel 35f is substantially parallel to at least the left-right direction.

The lower ends of the rotation units (the left front rotation unit 30a, the right front rotation unit 30b, the left rear rotation unit 30e, the right rear rotation unit 30f) are located below the lower ends of the tanks 90.

The left middle rotation unit 30c and the right middle rotation unit 30d are separated from the driving unit 10 to enable entry and exit between the outside of the floating moving device 1 and the boarding space of the driving unit 10 via the platform 21.

(Operation Control in the Second State, Takeoff, Etc.)

When the floating moving device 1 takes off, lands, and hovers, the control unit 15 further rotates the left middle motor 31c and causes the left middle transmission unit 37c to operate such that the rotational force of the left middle motor 31c is transmitted to the left middle impeller 33c.

Further, the control unit 15 rotates the right middle motor 31d and causes the right middle transmission unit 37d to operate such that the rotational force of the right middle motor 31d is transmitted to the right middle impeller 33d.

Further, the control unit 15 stops the other motors (the left front motor 31a, the right front motor 31b, the left rear motor 31e, and the right rear motor 31f).

The floating moving device 1 takes off, lands, or hovers according to the rotation of the impellers (the left middle impeller 33c, the right middle impeller 33d).

(Operation Control in the Third State, Air Movement in the First Flight Mode)

Figure 14:
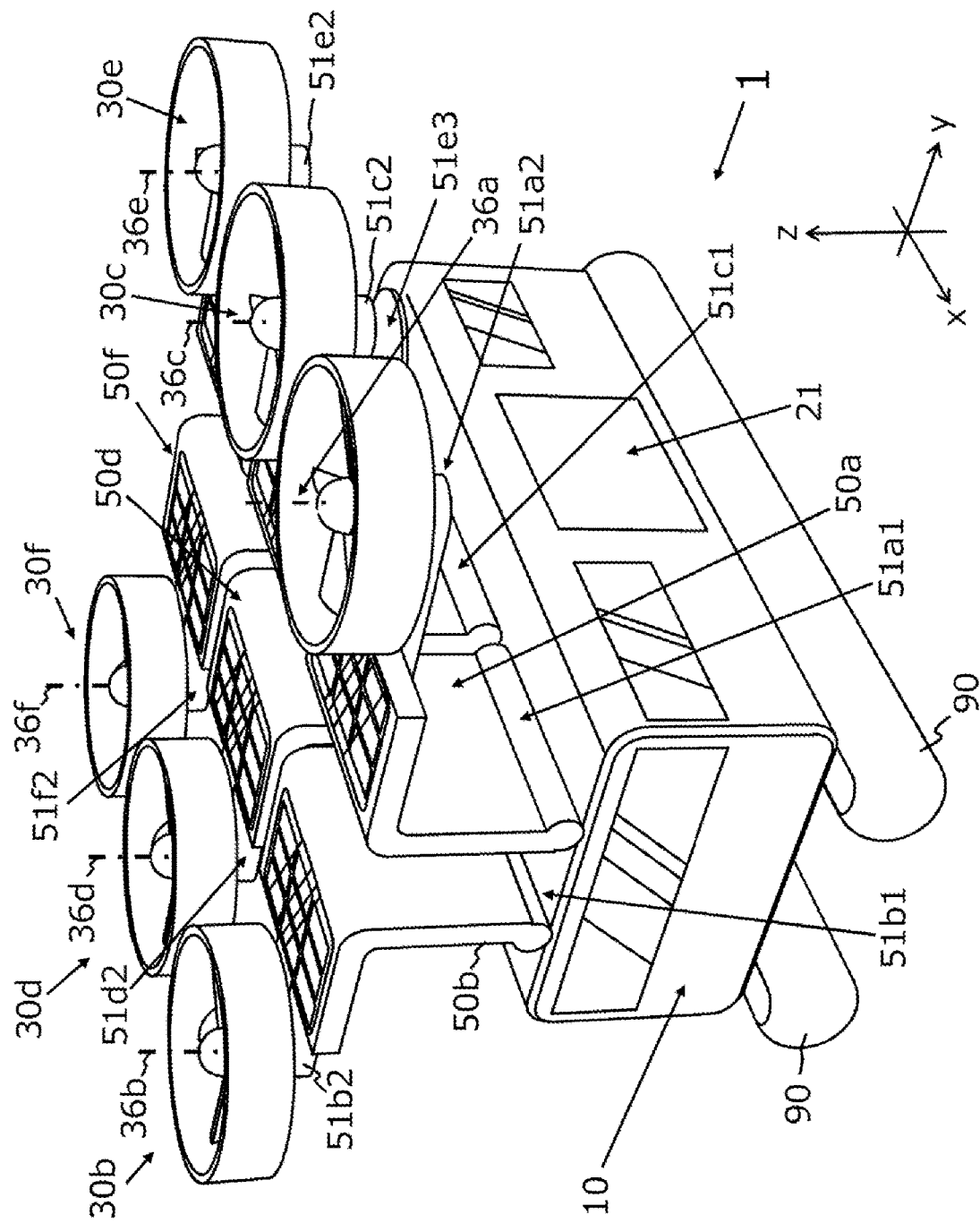
FIG. 14 is a perspective view of the floating moving device in the third state in the second embodiment.
Figure 15:
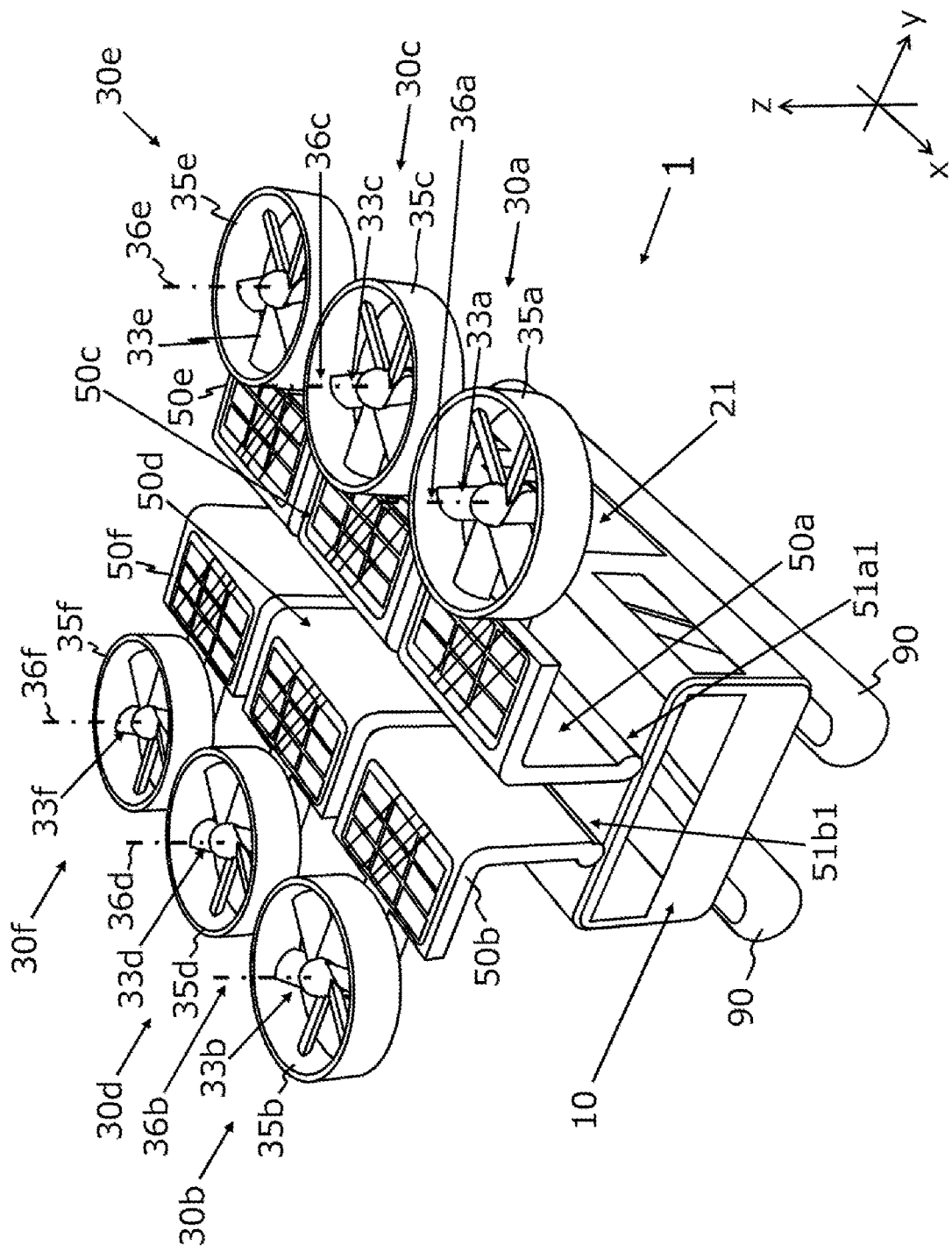
FIG. 15 is a perspective view further viewed from above than FIG. 14.

When the floating moving device 1 performs the air movement in the first flight mode, as in the third state in the first embodiment, the control unit 15 controls each unit such that the floating moving device 1 comes into the third state (see FIGS. 14 and 15).

Specifically, the control unit 15 causes the adjustment units (the left front primary adjustment unit 51a1, the left front secondary adjustment unit 51a2) of the left front connection unit 50a to operate such that the rotation axis 36a of the left front impeller 33a is substantially parallel to the z direction.

That is, the left front primary adjustment unit 51a1 and the left front secondary adjustment unit 51a2 adjust the positions and directions of the left front impeller 33a and the left front wheel 35a such that the rotation axis 36a of the left front impeller 33a and the left front wheel 35a is substantially parallel to at least the up-down direction and gas or the like sucked by the left front impeller 33a is jetted at least in the downward direction.

Further, the control unit 15 causes the adjustment units (the right front primary adjustment unit 51b1, the right front secondary adjustment unit 51b2) of the right front connection unit 50b to operate such that the rotation axis 36b of the right front impeller 33b is substantially parallel to the z direction.

That is, the right front primary adjustment unit 51b1 and the right front secondary adjustment unit 51b2 adjust the positions and directions of the right front impeller 33b and the right front wheel 35b such that the rotation axis 36b of the right front impeller 33b and the right front wheel 35b is substantially parallel to at least the up-down direction and gas or the like sucked by the right front impeller 33b is jetted at least in the downward direction.

Further, the control unit 15 causes the adjustment units (the left middle primary adjustment unit 51c1, the left middle secondary adjustment unit 51c2) of the left middle connection unit 50c to operate such that the rotation axis 36c of the left middle impeller 33c is substantially parallel to the z direction.

That is, the left middle primary adjustment unit 51c1 and the left middle secondary adjustment unit 51c2 adjust the positions and directions of the left middle impeller 33c and the left middle wheel 35c such that the rotation axis 36c of the left middle impeller 33c and the left middle wheel 35c is substantially parallel to at least the up-down direction and gas or the like sucked by the left middle impeller 33c is jetted at least in the downward direction.

Further, the control unit 15 causes the adjustment units (the right middle primary adjustment unit 51d1, the right middle secondary adjustment unit 51d2) of the right middle connection unit 50d to operate such that the rotation axis 36d of the right middle impeller 33d is substantially parallel to the z direction.

That is, the right middle primary adjustment unit 51d1 and the right middle secondary adjustment unit 51d2 adjust the positions and directions of the right middle impeller 33d and the right middle wheel 35d such that the rotation axis 36d of the right middle impeller 33d and the right middle wheel 35d is substantially parallel to at least the up-down direction and gas or the like sucked by the right middle impeller 33d is jetted at least in the downward direction.

Further, the control unit 15 causes the adjustment units (the left rear primary adjustment unit 51e1, the left rear secondary adjustment unit 51e2, the left rear tertiary adjustment unit 51e3) of the left rear connection unit 50e to operate such that the rotation axis 36e of the left rear impeller 33e is substantially parallel to the z direction.

That is, the left rear primary adjustment unit 51e1, the left rear secondary adjustment unit 51e2, and the left rear tertiary adjustment unit 51e3 adjust the positions and directions of the left rear impeller 33e and the left rear wheel 35e such that the rotation axis 36e of the left rear impeller 33e and the left rear wheel 35e is substantially parallel to at least the up-down direction and gas or the like sucked by the left rear impeller 33e is jetted at least in the downward direction.

Further, the control unit 15 causes the adjustment units (the right rear primary adjustment unit 51f1, the right rear secondary adjustment unit 51f2, the right rear tertiary adjustment unit 51f3) of the right rear connection unit 50f to operate such that the rotation axis 36f of the right rear impeller 33f is substantially parallel to the z direction.

That is, the right rear primary adjustment unit 51f1, the right rear secondary adjustment unit 51f2, and the right rear tertiary adjustment unit 51f3 adjust the positions and directions of the right rear impeller 33f and the right rear wheel 35f such that the rotation axis 36f of the right rear impeller 33f and the right rear wheel 35f is substantially parallel to at least the up-down direction and gas or the like sucked by the right rear impeller 33f is jetted at least in the downward direction.

The rotation units (the left front rotation unit 30a, the right front rotation unit 30b, the left middle rotation unit 30c, the right middle rotation unit 30d, the left rear rotation unit 30e, the right rear rotation unit 30f) are separated from the driving unit 10.

Further, the control unit 15 rotates the left front motor 31a and causes the left front transmission unit 37a to operate such that the rotational force of the left front motor 31a is transmitted to the left front impeller 33a.

Further, the control unit 15 rotates the right front motor 31b and causes the right front transmission unit 37b to operate such that the rotational force of the right front motor 31b is transmitted to the right front impeller 33b.

Further, the control unit 15 rotates the left middle motor 31c and causes the left middle transmission unit 37c to operate such that the rotational force of the left middle motor 31c is transmitted to the left middle impeller 33c.

Further, the control unit 15 also rotates the right middle motor 31d and causes the right middle transmission unit 37d to operate such that the rotational force of the right middle motor 31d is transmitted to the right middle impeller 33d.

Further, the control unit 15 rotates the left rear motor 31e and causes the left rear transmission unit 37e to operate such that the rotational force of the left rear motor 31e is transmitted to the left rear impeller 33e.

Further, the control unit 15 rotates the right rear motor 31f and causes the right rear transmission unit 37f to operate such that the rotational force of the right rear motor 31f is transmitted to the right rear impeller 33f.

The floating moving device 1 moves or hovers in the air according to the rotation of the impellers (the left front impeller 33a and the like).

(Operation Control in the Fourth State, Air Movement in the Second Flight Mode)

When the floating moving device 1 performs the air movement in the second flight mode, as in the fourth state in the first embodiment, the control unit 15 may control each unit such that the floating moving device 1 comes into the fourth state (not illustrated).

Specifically, the control unit 15 causes the adjustment units (the left front primary adjustment unit 51a1, the left front secondary adjustment unit 51a2) of the left front connection unit 50a such that the rotation axis 36a of the left front impeller 33a is substantially parallel to the x direction.

That is, the left front primary adjustment unit 51a1 and the left front secondary adjustment unit 51a2 adjust the positions and directions of the left front impeller 33a and the left front wheel 35a such that the rotation axis 36a of the left front impeller 33a and the left front wheel 35a is substantially parallel to at least the front-rear direction and gas or the like sucked by the left front impeller 33a is jetted at least in the rear direction.

Further, the control unit 15 causes the adjustment units (the right front primary adjustment unit 51b1, the right front secondary adjustment unit 51b2) of the right front connection unit 50b to operate such that the rotation axis 36b of the right front impeller 33b is substantially parallel to the x direction.

That is, the right front primary adjustment unit 51b1 and the right front secondary adjustment unit 51b2 adjust the positions and directions of the right front impeller 33b and the right front wheel 35b such that the rotation axis 36b of the right front impeller 33b and the right front wheel 35b is substantially parallel to at least the front-rear direction and gas or the like sucked by the right front impeller 33b is jetted at least in the rear direction.

Further, the control unit 15 causes the adjustment units (the left middle primary adjustment unit 51c1, the left middle secondary adjustment unit 51c2) of the left middle connection unit 50c to operate such that the rotation axis 36c of the left middle impeller 33c is substantially parallel to the x direction and does not overlap the left front impeller 33a when viewed from the x direction.

That is, the left middle primary adjustment unit 51c1 and the left middle secondary adjustment unit 51c2 adjust the positions and directions of the left middle impeller 33c and the left middle wheel 35c such that the rotation axis 36c of the left middle impeller 33c and the left middle wheel 35c is substantially parallel to at least the front-rear direction, gas or the like sucked by the left middle impeller 33c is jetted at least in the rear direction, and the rotation axis 36c of the left middle impeller 33c does not overlap the rotation axis 36a of the left front impeller 33a.

Further, the control unit 15 causes the adjustment units (the right middle primary adjustment unit 51d1, the right middle secondary adjustment unit 51d2) of the right middle connection unit 50d to operate such that the rotation axis 36d of the right middle impeller 33d is substantially parallel to the x direction and does not overlap the right front impeller 33b when viewed from the x direction.

That is, the right middle primary adjustment unit 51d1 and the right middle secondary adjustment unit 51d2 adjust the positions and direction of the right middle impeller 33d and the right middle wheel 35d such that the rotation axis 36d of the right middle impeller 33d and the right middle wheel 35d is substantially parallel to at least the front-rear direction, gas or the like sucked by the right middle impeller 33d is jetted at least in the rear direction, and the rotation axis 36d of the right middle impeller 33d does not overlap the rotation axis 36b of the right front impeller 33b.

Further, the control unit 15 causes the adjustment units (the left rear primary adjustment unit 51e1, the left rear secondary adjustment unit 51e2, the left rear tertiary adjustment unit 53e3) of the left rear connection unit 50e to operate such that the rotation axis 36e of the left rear impeller 33e is substantially parallel to the x direction and does not overlap the left front impeller 33a and the left middle impeller 33c when viewed from the x direction.

That is, the left rear primary adjustment unit 51e1, the left rear secondary adjustment unit 51e2, and the left rear tertiary adjustment unit 53e3 adjust the positions and directions of the left rear impeller 33e and the left rear wheel 35e such that the rotation axis 36e of the left rear impeller 33e and the left rear wheel 35e is substantially parallel to at least the front-rear direction, gas or the like sucked by the left rear impeller 33e is jetted at least in the rear direction, and the rotation axis 36e of the left rear impeller 33e does not overlap the rotation axis 36a of the left front impeller 33a and the rotation axis 36c of the left middle impeller 33c.

Further, the control unit 15 causes the adjustment units (the right rear primary adjustment unit 51f1, the right rear secondary adjustment unit 51f2, the right rear tertiary adjustment unit 51f3) of the right rear connection unit 50f to operate such that the rotation axis 36f of the right rear impeller 33f is substantially parallel to the x direction and does not overlap the right front impeller 33b and the right middle impeller 33d when viewed from the x direction.

That is, the right rear primary adjustment unit 51f1, the right rear secondary adjustment unit 51f2, and the right rear tertiary adjustment unit 51f3 adjust the positions and directions of the left rear impeller 33f and the right rear wheel 35f such that the rotation axis 36f of the right rear impeller 33f and the right rear wheel 35f is substantially parallel to at least the front-rear direction, gas or the like sucked by the right rear impeller 33f is jetted at least in the rear direction, and the rotation axis 36f of the right rear impeller 33f does not overlap the rotation axis 36b of the right front impeller 33b and the rotation axis 36d of the right middle impeller 33d.

Further, the control unit 15 rotates the left front motor 31a and causes the left front transmission unit 37a to operate such that the rotational force of the left front motor 31a is transmitted to the left front impeller 33a.

Further, the control unit 15 rotates the right front motor 31b and causes the right front transmission unit 37b to operate such that the rotational force of the right front motor 31b is transmitted to the right front impeller 33b.

Further, the control unit 15 rotates the left middle motor 31c and causes the left middle transmission unit 37c to operate such that the rotational force of the left middle motor 31c is transmitted to the left middle impeller 33c.

Further, the control unit 15 also rotates the right middle motor 31d and causes the right middle transmission unit 37d to operate such that the rotational force of the right middle motor 31d is transmitted to the right middle impeller 33d.

Further, the control unit 15 rotates the left rear motor 31e and causes the left rear transmission unit 37e to operate such that the rotational force of the left rear motor 31e is transmitted to the left rear impeller 33e.

Further, the control unit 15 rotates the right rear motor 31f and causes the right rear transmission unit 37f to operate such that the rotational force of the right rear motor 31f is transmitted to the right rear impeller 33f.

The floating moving device 1 moves in the air according to the rotation of the impellers (the left front impeller 33a and the like).

(Operation Control in the Fifth State, Water Movement)

Figure 16:
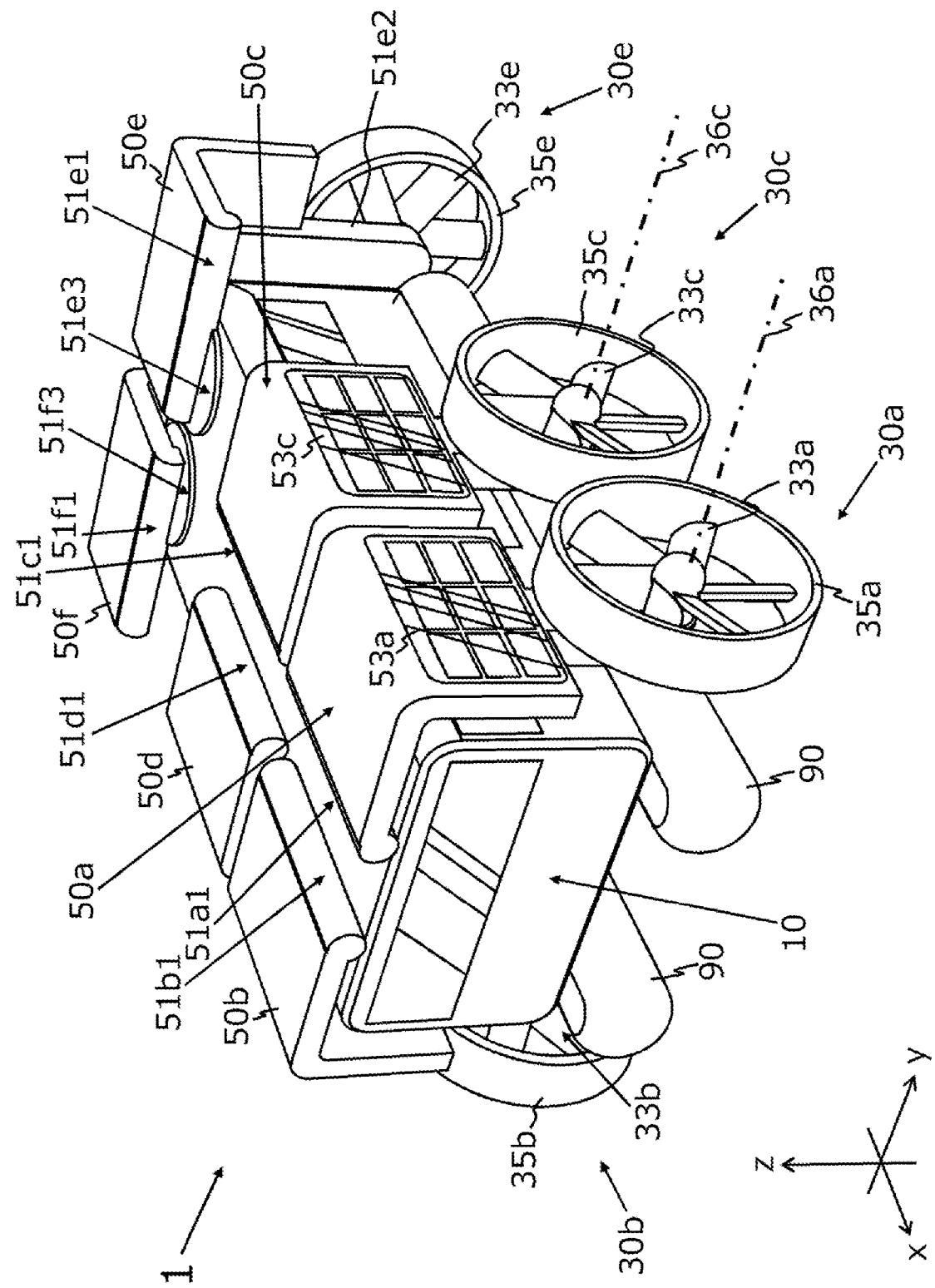
FIG. 16 is a perspective view of the floating moving device in the fifth state in the second embodiment viewed from the front and from above.
Figure 17:
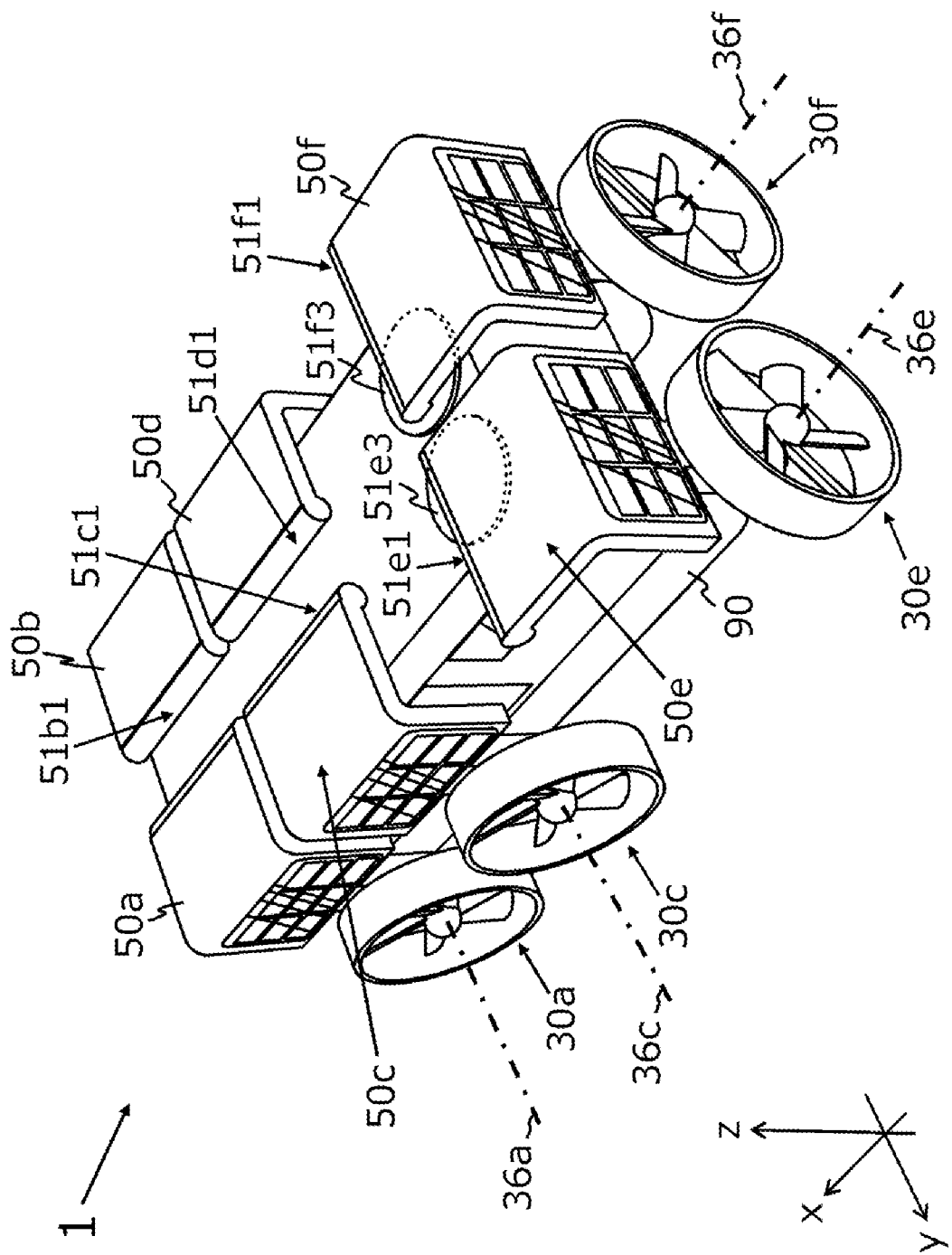
FIG. 17 is a perspective view of the floating moving device in the fifth state in the second embodiment viewed from the rear and from above.

When the floating moving device 1 performs the water movement, the control unit 15 controls each unit such that the floating moving device 1 comes into the fifth state (see FIGS. 16 and 17).

Specifically, the control unit 15 causes the adjustment units (the left front primary adjustment unit 51a1, the left front secondary adjustment unit 51a2) of the left front connection unit 50a to operate such that the rotation axis 36a of the left front impeller 33a is substantially parallel to the y direction.

That is, the left front primary adjustment unit 51a1 and the left front secondary adjustment unit 51a2 adjust the positions and directions of the left front impeller 33a and the left front wheel 35a such that the rotation axis 36a of the left front impeller 33a and the left front wheel 35a is substantially parallel to at least the left-right direction.

Further, the control unit 15 causes the adjustment units (the right front primary adjustment unit 51b1, the right front secondary adjustment unit 51b2) of the right front connection unit 50b to operate such that the rotation axis 36b of the right front impeller 33b is substantially parallel to the y direction.

That is, the right front primary adjustment unit 51b1 and the right front secondary adjustment unit 51b2 adjust the positions and directions of the right front impeller 33b and the right front wheel 35b such that the rotation axis 36b of the right front impeller 33b and the right front wheel 35b is substantially parallel to at least the left-right direction.

Further, the control unit 15 causes the adjustment units (the left middle primary adjustment unit 51c1, the left middle secondary adjustment unit 51c2) of the left middle connection unit 50c to operate such that the rotation axis 36c of the left middle impeller 33c is substantially parallel to the y direction.

That is, the left middle primary adjustment unit 51c1 and the left middle secondary adjustment unit 51c2 adjust the positions and direction of the left middle impeller 33c and the left middle wheel 35c such that the rotation axis 36c of the left middle impeller 33c and the left middle wheel 35c is substantially parallel to at least the left-right direction.

Further, the control unit 15 causes the adjustment units (the right middle primary adjustment unit 51d1, the right middle secondary adjustment unit 51d2) of the right middle connection unit 50d to operate such that the rotation axis 36d of the right middle impeller 33d is substantially parallel to the y direction.

That is, the right middle primary adjustment unit 51d1 and the right middle secondary adjustment unit 51d2 adjust the positions and directions of the right middle impeller 33d and the right middle wheel 35d such that the rotation axis 36d of the right middle impeller 33d and the right middle wheel 35d is substantially parallel to at least the left-right direction.

Further, the control unit 15 causes the adjustment units (the left rear primary adjustment unit 51e1, the left rear secondary adjustment unit 51e2, the left rear tertiary adjustment unit 53e3) of the left rear connection unit 50e to operate such that the rotation axis 36e of the left rear impeller 33e is substantially parallel to the x direction.

That is, the left rear primary adjustment unit 51e1, the left rear secondary adjustment unit 51e2, and the left rear tertiary adjustment unit 53e3 adjust the positions and directions of the left rear impeller 33e and the left rear wheel 35e such that the rotation axis 36e of the left rear impeller 33e and the left rear wheel 35e is substantially parallel to at least the front-rear direction.

Further, the control unit 15 causes the adjustment units (the right rear primary adjustment unit 51f1, the right rear secondary adjustment unit 51f2, the right rear tertiary adjustment unit 51f3) of the right rear connection unit 50f to operate such that the rotation axis 36f of the right rear impeller 33f is substantially parallel to the x direction.

That is, the right rear primary adjustment unit 51f1, the right rear secondary adjustment unit 51f2, and the right rear tertiary adjustment unit 51f3 adjust the positions and directions of the right rear impeller 33f and the right rear wheel 35f such that the rotation axis 36f of the right rear impeller 33f and the right rear wheel 35f is substantially parallel to at least the front-rear direction.

The control unit 15 stops the left front motor 31a, the right front motor 31b, the left middle motor 31c, and the right middle motor 31d.

The control unit 15 rotates the left rear motor 31e and the right rear motor 31f.

The impellers (the left rear impeller 33e and right rear impeller 33f) function as screws. According to the rotation of these, the floating moving device 1 moves on water.

(Another Form of the Water Movement)

Figure 18:
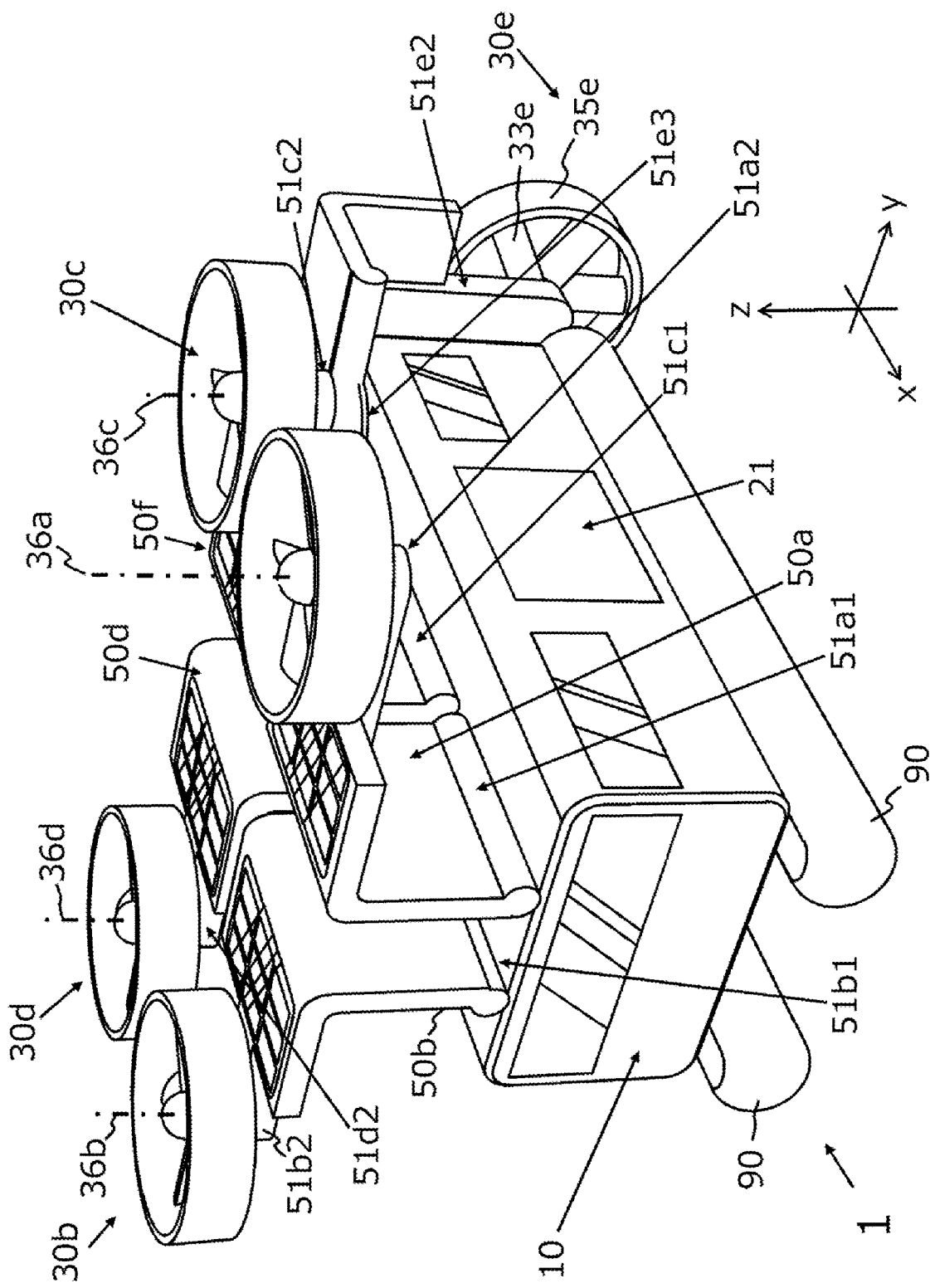
FIG. 18 is a perspective view of a floating moving device in a modification in the fifth state in the second embodiment viewed from the front and from above.
Figure 19:
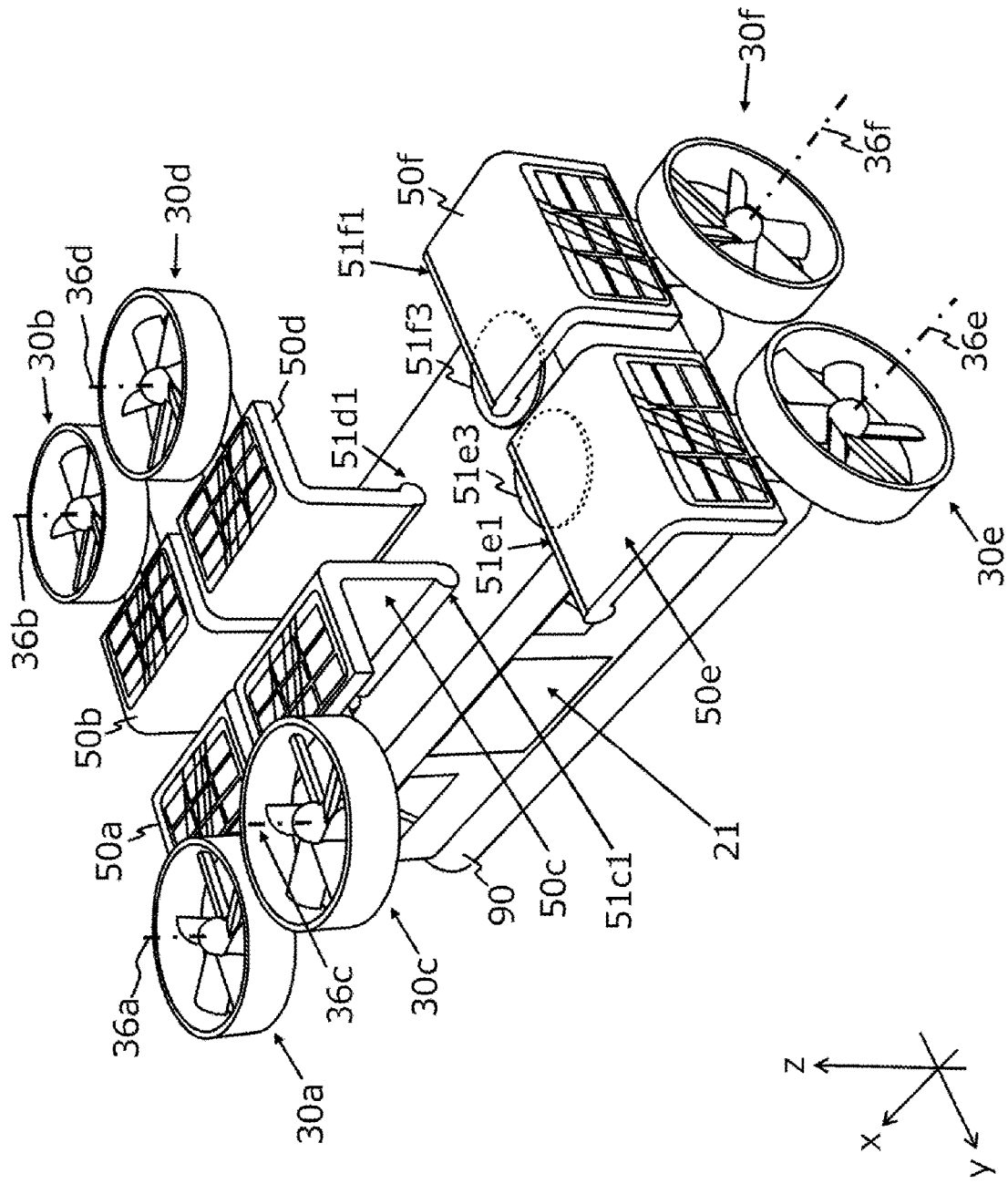
FIG. 19 is a perspective view of the floating moving device in the modification of the fifth state in the second embodiment viewed from the rear and from above.

Note that, when the water movement is performed, as the fifth state, the left front impeller 33a, the right front impeller 33b, the left middle impeller 33c, and the right middle impeller 33d may be disposed such that the rotation axes thereof are substantially parallel to the y direction or may be disposed such that the rotation axes thereof are substantially parallel to the z direction (see FIGS. 18 and 19).

(Correspondence Relation with Words and Phrases in Claims)

The "first rotation unit" described in the claims corresponds to the left front rotation unit 30a in the second embodiment, the "second rotation unit" described in the claims corresponds to the right front rotation unit 30b in the second embodiment, the "third rotation unit" described in the claims corresponds to the left rear rotation unit 30e and the right rear rotation unit 30f, the "fourth rotation unit" described in the claims corresponds to the left middle rotation unit 30c in the second embodiment, and the "fifth rotation unit" described in the claims corresponds to the right middle rotation unit 30d in the second embodiment.

However, the correspondence relation between the first to fifth rotation units and the left front rotation unit 30a and the like is not limited to the correspondence relation described in the first embodiment and the second embodiment.

In the first embodiment and the second embodiment, it is explained that the floating moving device 1 is provided with the boarding space in the driving unit 10 and operates according to the control from the inside. However, the floating moving device 1 may be a drone or the like in which the boarding space is not provided in the driving unit 10 and operates according to control from the outside.

In the drawings in the first embodiment and the second embodiment, an example is explained in which the adjustment units adjust the positions (at least the directions) of the impellers and the like such that the rotation axis is located in the direction parallel to any one of the x direction, the y direction, and the z direction.

However, not only this, but the adjustment units may adjust the positions (at least the directions) of the impellers and the like such that the rotation axis is located in a direction inclined with respect to these directions.

Although the several embodiments of the present invention are explained above, these embodiments are presented as examples and are not intended to limit the scope of the invention. These embodiments can be implemented in various other forms, and various omissions, substitutions, and changes can be made without departing from the gist of the invention. These embodiments and the modifications thereof are included in the scope and gist of the invention and are also included in the invention described in the claims and the scope of equivalents thereof.

REFERENCE SINGS LIST

1 Floating moving device
10 Driving unit
11 Operation unit
13 Detection unit
15 Control unit
17 Electric conversion unit
19 Power storage unit
21 Platform
30a Left front rotation unit
30b Right front rotation unit
30c Left middle rotation unit
30d Right middle rotation unit
30e Left rear rotation unit
30f Right rear rotation unit
31a Left front motor
31b Right front motor
31c Left middle motor
31d Right middle motor
31e Left rear motor
31f Right rear motor
33a Left front impeller
33b Right front impeller
33c Left middle impeller
33d Right middle impeller
33e Left rear impeller
33f Right rear impeller
35a Left front wheel
35b Right front wheel
35c Left middle wheel
35d Right middle wheel
35e Left rear wheel
35f Right rear wheel
36a Rotation axis of the left front impeller and the left front wheel
36b Rotation axis of the right front impeller and the right front wheel
36c Rotation axis of the left middle impeller and the left middle wheel
36d Rotation axis of the right middle impeller and the right middle wheel
36e Rotation axis of the left rear impeller and the left rear wheel
36f Rotation axis of the right rear impeller and the right rear wheel
37a Left front transmission unit
37b Right front transmission unit
37c Left middle transmission unit
37d Right middle transmission unit
37e Left rear transmission unit
37f Right rear transmission unit
40a Front center rotation unit
40b Rear center rotation unit
41a Front center motor
41b Rear center motor
43 Center impeller
43a Front center impeller
43b Rear center impeller
45a Front center wheel
45b Rear center wheel
46a Rotation axis of the front center impeller and the front center wheel
46b Rotation axis of the rear center impeller and the rear center wheel
50a Left front connection unit
50b Right front connection unit
50c Left middle connection unit
50d Right middle connection unit
50e Left rear connection unit
50f Right rear connection unit
51a1 Left front primary adjustment unit
51a2 Left front secondary adjustment unit
51b1 Right front primary adjustment unit
51b2 Right front secondary adjustment unit
51c1 Left middle primary adjustment unit
51c2 Left middle secondary adjustment unit
51d1 Right middle primary adjustment unit
51d2 Right middle secondary adjustment unit
51e1 Left rear primary adjustment unit
51e2 Left rear secondary adjustment unit
51e3 Left rear tertiary adjustment unit
51f1 Right rear primary adjustment unit
51f2 Right rear secondary adjustment unit
51f3 Right rear tertiary adjustment unit
53a Left front power generation unit
53b Right front power generation unit 53c Left middle power generation unit
53d Right middle power generation unit
53e Left rear power generation unit
53f Right rear power generation unit
60a Front center connection unit
60b Rear center connection unit
61a Front center adjustment unit
61b Rear center adjustment unit
90 Tank

The invention claimed is:

1. A floating moving device comprising:
a first rotation unit including a first impeller, a first wheel, and a first adjustment unit;
a second rotation unit including a second impeller, a second wheel, and a second adjustment unit;
a third rotation unit including a third impeller, a third wheel, and a third adjustment unit;
a fourth rotation unit including a fourth impeller and a fourth adjustment unit; and
a fifth rotation unit including a fifth impeller and a fifth adjustment unit, wherein
the fourth adjustment unit adjusts a direction of at least the fourth impeller such that a rotation axis of the fourth impeller is parallel to at least an up-down direction at a takeoff time,
the fifth adjustment unit adjusts a direction of at least the fifth impeller such that a rotation axis of the fifth impeller is parallel to at least the up-down direction at the takeoff time,
the first adjustment unit adjusts a position of at least the first wheel such that the first wheel comes into contact with a ground until the takeoff is performed,
the second adjustment unit adjusts a position of at least the second wheel such that the second wheel comes into contact with the ground until the takeoff is performed,
the third adjustment unit adjusts a position of at least the third wheel such that the third wheel comes into contact with the ground until the takeoff is performed and adjusts a direction of at least the third impeller such that a rotation axis of the third impeller is parallel to at least a front-rear direction when a water movement is performed,
the first rotation unit includes a left front rotation unit including the first impeller, the first wheel, and the first adjustment unit,
the second rotation unit includes a right front rotation unit including the second impeller, the second wheel, and the second adjustment unit,
the fourth rotation unit includes a left middle rotation unit including the fourth impeller and the fourth adjustment unit, the left middle rotation unit being provided behind the left front rotation unit, and
the fifth rotation unit includes a right middle rotation unit including the fifth impeller and the fifth adjustment unit, the right middle rotation unit being provided behind the right front rotation unit.

2. The floating moving device according to claim 1, wherein
the first adjustment unit adjusts a direction of at least the first impeller such that the rotation axis of the first impeller is parallel to at least the up-down direction when the air movement in a first flight mode or the water movement is performed, and
the second adjustment unit adjusts a direction of at least the second impeller such that the rotation axis of the second impeller is parallel to at least the up-down direction when the air movement in the first flight mode or the water movement is performed.

3. The floating moving device according to claim 1, wherein
the fourth rotation unit includes a fourth wheel,
the fifth rotation unit includes a fifth wheel,
the fourth rotation unit includes a first transmission unit that transmits a first rotational force to the fourth impeller or the fourth wheel,
the fifth rotation unit includes a second transmission unit that transmits a second rotational force to the fifth impeller or the fifth wheel,
the first transmission unit transmits the first rotational force to the fourth impeller at the takeoff time and transmits the first rotational force to the fourth wheel at a land movement time, and
the second transmission unit transmits the second rotational force to the fifth impeller at the takeoff time and transmits the second rotational force to the fifth wheel at the land movement time.

4. The floating moving device according to claim 1, wherein
the third rotation unit includes a left rear rotation unit provided behind the left middle rotation unit and a right rear rotation unit provided behind the right middle rotation unit,
each of the left rear rotation unit and the right rear rotation unit includes the third impeller, the third wheel, and the third adjustment unit,
the fourth rotation unit includes the left middle rotation unit, and
the fifth rotation unit includes the right middle rotation unit.

5. The floating moving device according to claim 1, further comprising:
a hydrogen tank; and
an electric conversion unit that generates electricity based on hydrogen supplied from the hydrogen tank, wherein
electric power obtained by the electric conversion unit is supplied to the first rotation unit to the fifth rotation unit.

6. The floating moving device according to claim 5, wherein
a pair of the hydrogen tanks is provided, and
the third rotation unit is provided between the two hydrogen tanks.

7. The floating moving device according to claim 1, wherein
the fourth adjustment unit adjusts a direction of at least the fourth impeller such that the rotation axis of the fourth impeller is parallel to at least the front-rear direction when the air movement in a second flight mode is performed,
the fifth adjustment unit adjusts a direction of at least the fifth impeller such that the rotation axis of the fifth impeller is parallel to at least the front-rear direction when the air movement in the second flight mode is performed,
the first adjustment unit adjusts a direction of at least the first impeller such that the rotation axis of the first impeller is parallel to at least the front-rear direction and does not overlap with the fourth impeller when viewed from the front-rear direction when the air movement in the second flight mode is performed,
the second adjustment unit adjusts a direction of at least the second impeller such that the rotation axis of the second impeller is parallel to at least the front-rear direction and does not overlap with the fifth impeller when viewed from the front-rear direction when the air movement in the second flight mode is performed, and the third adjustment unit adjusts a direction of at least the third impeller such that the rotation axis of the third impeller is parallel to at least the front-rear direction when the floating moving device performs the air movement in the second flight mode.

8. The floating moving device according to claim 7, wherein the first rotation unit includes the left front rotation unit and a left rear rotation unit provided behind the left middle rotation unit, each of the left front rotation unit and the left rear rotation unit includes the first impeller, the first wheel, and the first adjustment unit, the second rotation unit includes the right front rotation unit and a right rear rotation unit provided behind the right middle rotation unit, each of the right front rotation unit and the right rear rotation unit includes the second impeller, the second wheel, and the second adjustment unit, the third rotation unit includes a front center rotation unit provided between the left front rotation unit and the right front rotation unit and a rear center rotation unit provided between the left rear rotation unit and the right rear rotation unit, when the air movement is performed in the second flight mode, the left middle impeller corresponding to the fourth impeller and included in the left middle rotation unit, the left front impeller corresponding to the first impeller and included in the left front rotation unit, and the left rear impeller corresponding to the first impeller and included in the left rear rotation unit are adjusted such that at least the rotation axes do not overlap, and when the air movement is performed in the second flight mode, the right middle impeller corresponding to the fifth impeller and included in the right middle rotation unit, the right front impeller corresponding to the second impeller and included in the right front rotation unit, and the right rear impeller corresponding to the second impeller and included in the right rear rotation unit are adjusted such that at least the rotation axes do not overlap.

9. The floating moving device according to claim 1, wherein the first rotation unit includes the left front rotation unit and a left rear rotation unit provided behind the left middle rotation unit, each of the left front rotation unit and the left rear rotation unit includes the first impeller, the first wheel, and the first adjustment unit, the second rotation unit includes the right front rotation unit and a right rear rotation unit provided behind the right middle rotation unit, each of the right front rotation unit and the right rear rotation unit includes the second impeller, the second wheel, and the second adjustment unit, the third rotation unit includes at least one of a front center rotation unit provided between the left front rotation unit and the right front rotation unit and a rear center rotation unit provided between the left rear rotation unit and the right rear rotation unit.

10. The floating moving device according to claim 9, wherein the third rotation unit includes the front center rotation unit and the rear center rotation unit, and when the rotation axis of the impeller of the front center rotation unit and the rotation axis of the impeller of the rear center rotation unit operate in an overlapping positional relation, operation control is performed such that the impeller of the front center rotation unit and the impeller of the rear center rotation unit rotate in opposite directions.

* * * * *